United States Patent
Masaki et al.

(10) Patent No.: US 9,237,375 B2
(45) Date of Patent: Jan. 12, 2016

(54) PORTABLE INFORMATION PROCESSING DEVICE

(75) Inventors: Yasuo Masaki, Daito (JP); Sei Kohno, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 141 days.

(21) Appl. No.: 13/638,371

(22) PCT Filed: Mar. 31, 2011

(86) PCT No.: PCT/JP2011/058162
§ 371 (c)(1),
(2), (4) Date: Sep. 28, 2012

(87) PCT Pub. No.: WO2011/125807
PCT Pub. Date: Oct. 13, 2011

(65) Prior Publication Data
US 2013/0027314 A1    Jan. 31, 2013

(30) Foreign Application Priority Data
Apr. 1, 2010 (JP) .................. 2010-084982

(51) Int. Cl.
G09G 5/00 (2006.01)
H04N 21/436 (2011.01)
H04N 5/775 (2006.01)
H04N 21/41 (2011.01)
(Continued)

(52) U.S. Cl.
CPC ......... *H04N 21/43615* (2013.01); *H04N 5/775* (2013.01); *H04N 21/4122* (2013.01); *H04N 21/43635* (2013.01); *H04N 5/765* (2013.01)

(58) Field of Classification Search
CPC ... G06F 1/1626; G06F 3/1423; G06F 3/1462; H04M 1/72522; H04M 1/72533
USPC ............. 345/1.1, 169, 204; 455/556.1, 556.2, 455/566
See application file for complete search history.

(56) References Cited

U.S. PATENT DOCUMENTS

| 7,962,854 B2 | 6/2011 | Vance et al. |
| 8,175,644 B1* | 5/2012 | Jeffrey ...................... 455/556.1 |
| 8,321,898 B2* | 11/2012 | Yuasa et al. ................... 725/82 |

(Continued)

FOREIGN PATENT DOCUMENTS

| JP | 2003-319097 A | 11/2003 |
| JP | 2004-120713 A | 4/2004 |

(Continued)

OTHER PUBLICATIONS

Extended European Search Report dated Jan. 23, 2014 {Six (6) pages}.

(Continued)

*Primary Examiner* — Jennifer Nguyen
(74) *Attorney, Agent, or Firm* — Crowell & Moring LLP

(57) ABSTRACT

Disclosed is a portable information processing device which can improve convenience by reducing an operational burden resulting from a selecting operation of the user. A control portion (18a) of the portable information processing device (1) selects, at least on the basis of that an external display device (5) is connected and a prescribed application is being started, a second mode from a first mode causing an external display device to display the same data as the data displayed on an built-in display portion (10) and the second mode causing the built-in display portion to display data different from the data displayed on the external display device.

18 Claims, 19 Drawing Sheets

(51) Int. Cl.
*H04N 21/4363* (2011.01)
*H04N 5/765* (2006.01)

(56) References Cited

U.S. PATENT DOCUMENTS

| | | | |
|---|---|---|---|
| 2004/0107303 A1* | 6/2004 | Mulligan | 710/1 |
| 2008/0076470 A1 | 3/2008 | Ueda et al. | |
| 2008/0266067 A1* | 10/2008 | Takashima | 340/425.5 |
| 2009/0002568 A1 | 1/2009 | Konda et al. | |
| 2009/0040381 A1 | 2/2009 | Fukui | |
| 2009/0153289 A1 | 6/2009 | Hope et al. | |
| 2010/0060549 A1 | 3/2010 | Tsern | |
| 2010/0060572 A1* | 3/2010 | Tsern | 345/157 |
| 2010/0064055 A1 | 3/2010 | Krikorian et al. | |
| 2010/0122177 A1 | 5/2010 | Yoshioka | |
| 2010/0167809 A1* | 7/2010 | Perlman et al. | 463/24 |
| 2012/0280907 A1* | 11/2012 | Masaki et al. | 345/156 |
| 2013/0027314 A1 | 1/2013 | Masaki et al. | |

FOREIGN PATENT DOCUMENTS

| | | |
|---|---|---|
| JP | 2008-109341 A | 5/2008 |
| JP | 2008-517525 A | 5/2008 |
| JP | 2008-153876 A | 7/2008 |
| JP | 2009-16967 A | 1/2009 |
| JP | 2009-42967 A | 2/2009 |
| JP | 2009-44253 A | 2/2009 |
| JP | 2009-123032 A | 6/2009 |
| JP | 2011-217236 A | 10/2011 |
| WO | WO 2006/028203 A1 | 3/2006 |
| WO | WO 2008/117586 A1 | 10/2008 |

OTHER PUBLICATIONS

International Search Report dated Apr. 26, 2011 including English-language translation (Two (2) pages).
Japanese-language Written Opinion (PCT/ISA/237) dated Apr. 26, 2011 (Four (4) pages).

* cited by examiner

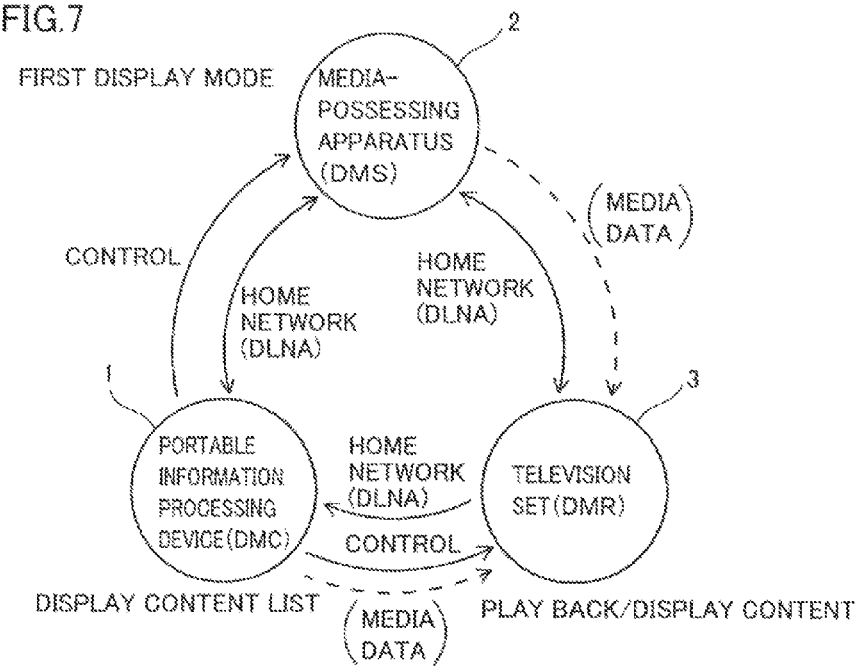
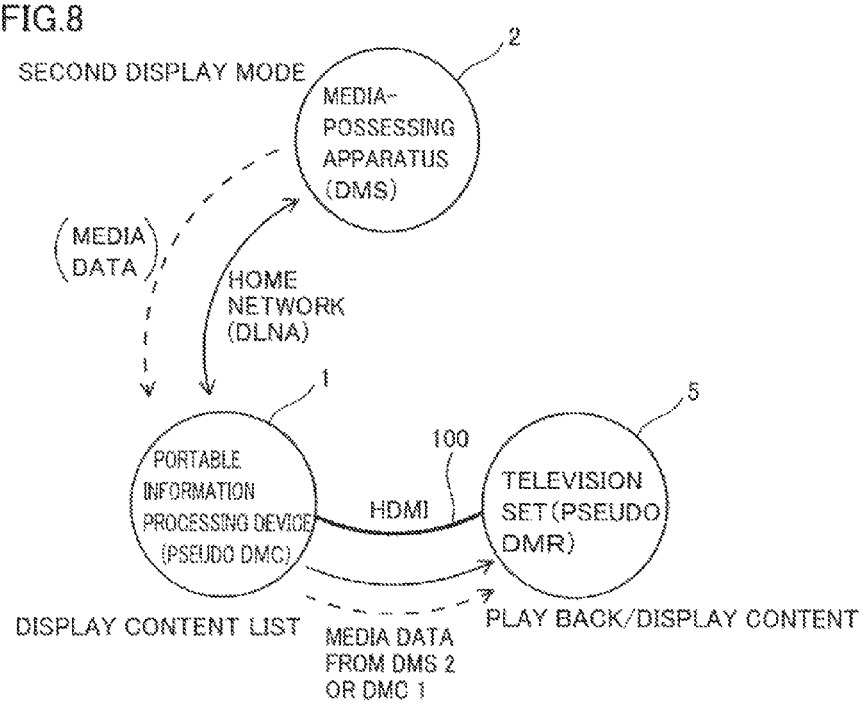

PORTABLE INFORMATION PROCESSING DEVICE

TECHNICAL FIELD

The present invention relates to a portable information processing device, and more particularly, it relates to a portable information processing device connectable with an external display device without through a network.

BACKGROUND TECHNIQUE

A portable information processing device connectable with an external display device without through a network is known in general. Such a portable information processing device is disclosed in National Patent Publication Gazette No. 2008-517525, for example.

In the aforementioned National Patent Publication Gazette No. 2008-517525, there is disclosed a portable communication device (portable information processing device), having a display (built-in display portion), connectable with an external display device without through a network. This portable communication device is formed to be capable of causing the external display device to display an image different from an image displayed on the display, and formed to perform control of causing the display to display a self-side monitor image while causing the external display device to display a remote image different from the image displayed on the display in a case of receiving a call of a teleconference or in a case where a teleconference is started.

In the portable communication device (portable information processing device) described in the aforementioned National Patent Publication Gazette No. 2008-517525, it is possible to cause the display (built-in display portion) to display the self-side monitor image and to cause the external display device to display the remote image different from the image displayed on the display in the case of receiving the call of the teleconference or the like, while it is conceivably not possible to cause the built-in display portion and the external display device to display the same image. In the portable communication device according to the aforementioned National Patent Publication Gazette No. 2008-517525, therefore, there is conceivably such an inconvenience that it is not possible to distinguishably use a mode causing the built-in display portion and the external display device to display different images and a mode causing the built-in display portion and the external display device to display the same image in response to the situation.

Therefore, there has generally been proposed an information processing device capable of distinguishably using a mode causing a built-in display portion and an external display device to display different images and a mode causing the built-in display portion and the external display device to display the same image. Such an information processing device is disclosed in Japanese Patent Laying-Open No. 2009-44253, for example.

In the aforementioned Japanese Patent Laying-Open No. 2009-44253, there is disclosed an information processing device, having a display (built-in display portion), connectable with an external picture apparatus without through a network. This information processing device is formed to be capable of clone display (first mode) causing the external display device to display the same image as an image displayed on the display and multidisplay (second mode) causing the external display device to display an image different from an image displayed on the display, and so formed that the user previously sets which display method is to be employed.

PRIOR ART

Patent Document

Patent Document 1: National Patent Publication Gazette No. 2008-517525
Patent Document 2: Japanese Patent Laying-Open No. 2009-44253

SUMMARY OF THE INVENTION

Problem to be Solved by the Invention

However, while the information processing device (portable information processing device) described in the aforementioned Japanese Patent Laying-Open No. 2009-44253 is capable of the clone display causing the display (built-in display portion) and the external display device to display the same image and the multidisplay causing the external display device to display the image different from the image displayed on the display, the user must previously set which display method is to be employed, and hence a selecting operation (resetting) of the user is required also in a case of selecting the clone display or the multidisplay in response to the situation such that an operational burden on the user increases, leading to such a problem that convenience lowers.

The present invention has been proposed in order to solve the aforementioned problem, and an object of the present invention is to provide a portable information processing device capable of improving convenience by reducing an operational burden resulting from a selecting operation of the user.

Means for Solving the Problem and Effects of the Invention

A portable information processing device according to an aspect of the present invention includes a built-in display portion capable of displaying data, a control portion, controlling a display on the built-in display portion, capable of acquiring data, and an external display device connection portion directly connectable with an external display device without through a network, and is formed to be switchable between a first mode causing the built-in display portion to display the data while causing the external display device to display the same data as the data displayed on the built-in display portion and a second mode causing the external display device to display data while causing the built-in display portion to display data different from the data displayed on the external display device, while the control portion is formed to select the second mode from the first mode and the second mode at least on the basis of that the external display device is connected to the external display device connection portion and a prescribed application is being started.

In the portable information processing device according to this aspect, as hereinabove described, the control portion selecting the second mode from the first mode causing the built-in display portion to display the data while causing the external display device to display the same data as the data displayed on the built-in display portion and the second mode causing the external display device to display the data while causing the built-in display portion to display the data different from the data displayed on the external display device at least on the basis of that the external display device is connected to the external display device connection portion and the prescribed application is being started so that the second mode is selected in a case where it is preferable to bring the portable information processing device into the second mode in response to the situation, whereby display modes (the first mode and the second mode) of the built-in display portion and the external display device can be selectively distinguishably used. Further, the second mode is automatically selected from the first mode and the second mode by the control portion at least on the basis of that the external display device is connected to the external display device connection portion and the prescribed application is being started, whereby the second mode (expanded display mode) is selected in a case where the user does not perform a mode selecting operation but the prescribed application is being started, while the first mode (mirror display mode) is selected in a case of other applications. Thus, an operational burden resulting from the mode selecting operation of the user can be reduced, whereby convenience can be improved.

Preferably in the portable information processing device according to the aforementioned aspect, the control portion is formed to cause the external display device to display data of the prescribed application and to cause the built-in display portion to display an image for accepting an instruction or entry related to the prescribed application in the second mode. When forming the portable information processing device in this manner, the user can perform an instruction or entry related to the application displayed on the external display device through the built-in display portion of the portable information processing device at hand while observing data of the application displayed on the external display device. Thus, the user can perform the instruction or the entry related to the application displayed on the external display device at hand while observing data of the application on the external display device whose size is large, for example, whereby the data of the application can be rendered easily recognizable and the instruction or the entry related to the application can be rendered easily performable. Consequently, the convenience can be further improved.

Preferably in the portable information processing device according to the aforementioned aspect, the control portion is formed to select the second mode from the first mode and the second mode at least on the basis of that the external display device is connected to the external display device connection portion and a media player or an application accompanied by character entry is being started. When forming the portable information processing device in this manner, the second mode is automatically selected in a case where the media player or the application accompanied by character entry is being started, whereby convenience in usage of the media player or at the time of character entry can be improved.

Preferably in this case, the control portion is formed to select the second mode for causing the external display device to display media data of the media player and to cause the built-in display portion to display a list of the media data so that selection of the media data is possible on the basis of that the external display device is connected to the external display device connection portion and an application of the media player is being started while an operation related to playback regarding the external display device as an output destination is performed. When forming the portable information processing device in this manner, the control portion can perform expanded display of causing the external display device to play back/display selected media data while causing the built-in display portion at hand to display the list of the media data on the basis of that the external display device is connected and the operation related to the playback regarding the external display device as the output destination has been performed when the user uses the media player by starting the application of the media player, whereby convenience for the user at the time of usage of the media player can be improved.

Preferably in the aforementioned structure causing the built-in display portion to display the list of the media data, the control portion is formed to select the second mode on the basis of that a playback operation for the media data of the media player regarding the external display device as the output destination has been performed in a state where the external display device is connected to the external display device connection portion and in a state where the application of the media player is being started, or that connection of the external display device to the external display device connection portion has been performed in the state where the application of the media player is being started and in a state where a playback operation for the media data is being performed. When forming the portable information processing device in this manner, the second mode (expanded display mode) is automatically selected when the media data regarding the external display device as the output destination is simply selected by the user during usage of the media player or he/she simply connects the external display device during the playback operation, whereby convenience for the user in usage of the media player can be improved.

Preferably in the aforementioned structure selecting the second mode on the basis of that the playback operation for the media data or connection of the external display device has been performed, the control portion is formed to select the second mode in response to that media data played back when performing the playback operation for the media data regarding the external display device as the output destination has been selected by the user from the list of the media data in the state where the external display device is connected to the external display device connection portion and in the state where the application of the media player is being started. When forming the portable information processing device in this manner, the second mode (expanded display mode) is automatically selected by the control portion when the user simply selects the media data, whereby the user may not separately perform a mode selecting operation for selecting the first mode and the second mode.

Preferably in the aforementioned structure causing the built-in display portion to display the list of the media data, the portable information processing device further includes at least either a recording medium connection portion capable of connecting a portable recording medium in which media data is stored, or a built-in memory capable of storing the media data, and the control portion is formed to select the second mode on the basis of that the external display device is connected to the external display device connection portion and the application of the media player is being started while an operation related to playback of media data of at least either the portable recording medium or the built-in memory is performed while regarding the external display device as an output destination. When forming the portable information processing device in this manner, the control portion can perform expanded display according to the second mode causing the external display device to display the media data stored in at least either the portable recording medium or the built-in memory while causing the built-in display portion to display the list of the media data.

Preferably in the aforementioned structure causing the built-in display portion to display the list of the media data, the portable information processing device further includes a communication portion capable of making communication based on a prescribed network standard with a corresponding apparatus functioning as a digital media server by the prescribed network standard allowing sharing of media data between corresponding apparatuses connected to a network, and the control portion is formed to select the second mode on the basis of that the external display device is connected to the external display device connection portion and the application of the media player is being started while an operation related to playback of media data of the digital media server has been performed while regarding the external display device as an output destination. As the prescribed network standard of the present invention, there is the DLNA (Digital Living Network Association) standard, for example. When forming the portable information processing device in this manner, the control portion can perform expanded display according to the second mode causing the external display device, directly connected without through the network, to display media data stored in the digital media server in the network corresponding to the prescribed network standard such as the DLNA and causing the built-in display portion to display the list of the media data.

Preferably in the aforementioned structure including the communication portion capable of communication according to the prescribed network, the portable information processing device is formed to cause the external display device directly connected to the external display device connection portion without through the network to display media data acquired from the digital media server via the network through the communication portion as a pseudo digital media renderer and to cause the built-in display portion to display the list of the media data so that selection of the media data is possible as a pseudo digital media controller. When forming the portable information processing device in this manner, the control portion can easily cause the external display device directly connected to the built-in display portion without through the network to display media data acquired from the digital media server corresponding to the prescribed network standard in the network, and can cause the built-in display portion to display the list of the media data.

Preferably in the aforementioned structure causing the built-in display portion to display the list of the media data, the control portion is formed to switch the portable information processing device from the second mode to the first mode on the basis of that the replay operation for the media data has terminated. When forming the portable information processing device in this manner, the control portion can easily switch the portable information processing device to the mirror display according to the first mode after termination of the playback operation.

Preferably in the aforementioned structure causing the built-in display portion to display the list of the media data, the control portion is formed to cause the built-in display portion to display media data being played back in a case where the application of the media player is being started and the playback operation for the media data regarding the external display device as the output destination is performed when the external display device is disconnected from the external display device connection portion. When forming the portable information processing device in this manner, media data being played back is displayed on the built-in display portion in a case where the external display device is so disconnected from the external display device connection portion that the media data being played back cannot be displayed on the external display device, whereby the user can continuously observe the media data being played back.

Preferably in the portable information processing device according to the aforementioned aspect, the control portion is formed to select the second mode at least on the basis of that the external display device is connected to the external display device connection portion and an application accompanied by character entry is being started. When forming the portable information processing device in this manner, the second mode (expanded display mode) can be automatically selected by the control portion in a case of performing character entry, whereby data for the character entry can be displayed on the built-in display portion at hand while displaying the data of the application on the external display device, and the character entry can be easily performed as a result.

Preferably in this case, the control portion is formed to select the second mode in response to at least either a starting operation for the application accompanied by character entry or an operation at the time of character entry during starting of the application accompanied by character entry. When forming the portable information processing device in this manner, the second mode is automatically selected by the control portion when the user simply starts the application accompanied by character entry or performs the operation at the time of character entry during starting of the application accompanied by character entry, whereby the user may not separately perform a mode selecting operation for selecting the first mode and the second mode.

Preferably in the aforementioned structure selecting the second mode on the basis of that the application accompanied by character entry is being started, the control portion is formed to cause the external display device to display data of the application accompanied by character entry and to cause the built-in display portion to display a touch panel keyboard for character entry as an image for accepting entry at the time of the second mode. When forming the portable information processing device in this manner, the user can perform character entry by employing the touch panel keyboard displayed on the built-in display portion at hand while observing the data of the application displayed on the external display device, whereby he/she can easily perform the character entry, and the convenience can be further improved.

Preferably in the aforementioned structure causing the built-in display portion to display the touch panel keyboard, the control portion is formed to cause the external display device to display the data of the application accompanied by character entry in such a mode that an entry result of the character entry is displayed and to cause the built-in display portion to display the touch panel keyboard for character entry and the entry result of the character entry in the second mode. When forming the portable information processing device in this manner, the entry result of the character entry is displayed on both of the external display device and the built-in display portion, whereby the user can confirm the entry result of the character entry on either one of the external display device and the built-in display portion.

Preferably in the aforementioned structure selecting the second mode on the basis of that the application accompanied by character entry is being started, the application accompanied by character entry includes a plurality of types of applications, and the control portion is formed to return the portable information processing device to one of the first mode and the second mode having been selected before performing the character entry in a case where character entry with respect to a prescribed application included in the plurality of applications accompanied by character entry terminates in the second mode. When forming the portable information processing device in this manner, the portable information processing device is automatically returned to the mode before performing the character entry by the control portion in a case where the character entry terminates, whereby the user may not perform the operation of switching the portable information processing device to the mode before performing the character entry.

Preferably in the portable information processing device according to the aforementioned aspect, the external display device connection portion includes a connection portion corresponding to a prescribed interface standard capable of connecting two apparatuses with each other by a prescribed cable capable of transmitting sound data, picture data and a control signal and performing a cooperative operation between the apparatuses with respect to the external display device directly connected without through the network. As the prescribed interface standard in the present invention, there is the HDMI (High-Definition Multimedia Interface) standard, for example. When forming the portable information processing device in this manner, not only the sound data and the picture data but also the control signal can be easily transmitted between the portable information processing device and the external display device due to the connection portion corresponding to the prescribed interface standard such as the HDMI, whereby the portable information processing device and the external display device can be easily made to cooperate with each other.

BRIEF DESCRIPTION OF THE DRAWINGS

FIG. 7 A diagram for illustrating a display mode (first display mode) of the home network system shown in FIG. 1.

FIG. 8 A diagram for illustrating another display mode (second display mode) of the home network system shown in FIG. 1.

MODES FOR CARRYING OUT THE INVENTION

Embodiments of the present invention are now described on the basis of the drawings.

First Embodiment

The structure of a portable information processing device 1 according to a first embodiment of the present invention is described with reference to FIGS. 1 to 17.

Figure 1:
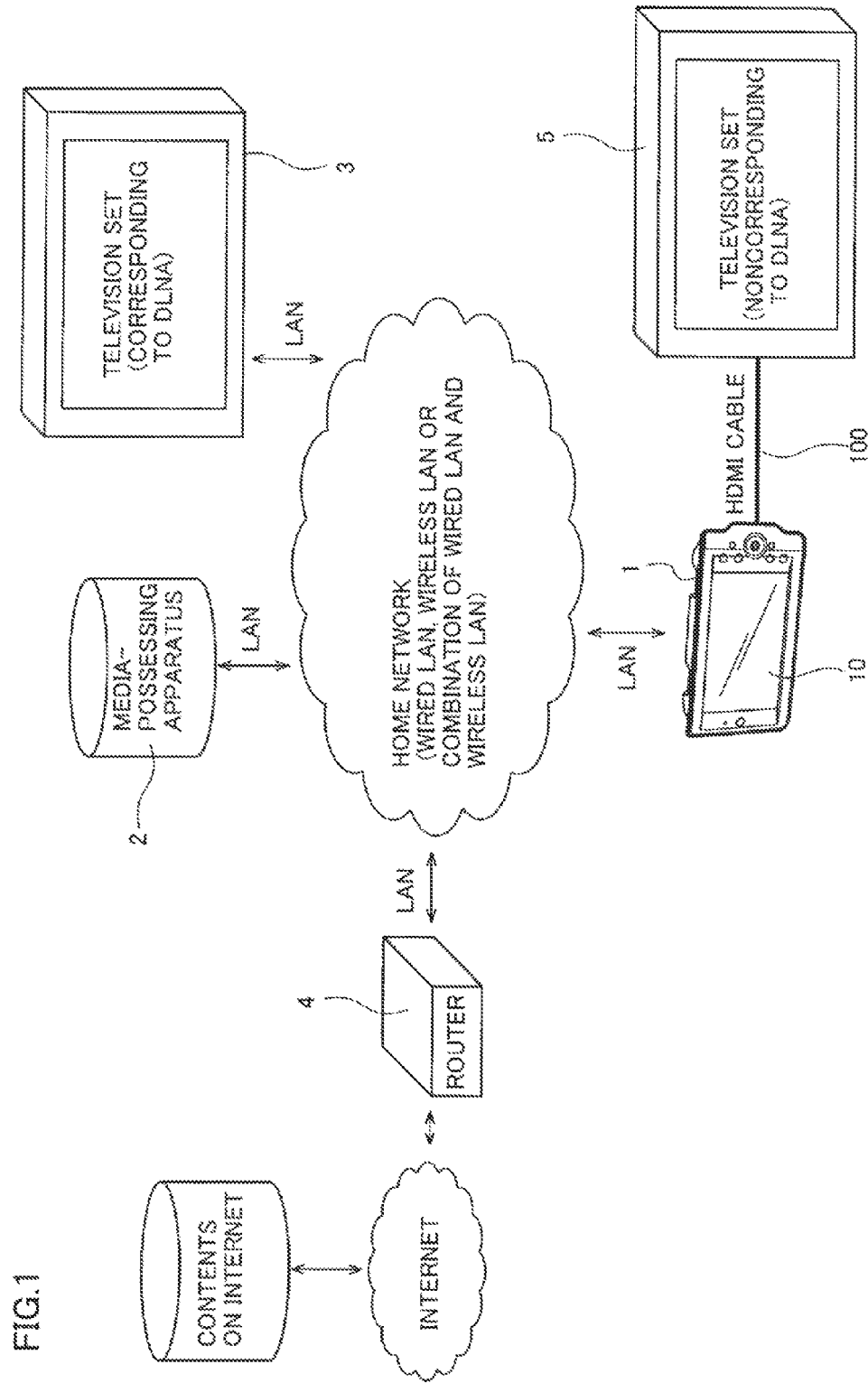
FIG. 1 A diagram showing the structure of a home network system employing a portable information processing device according to a first embodiment of the present invention.

In this home network system, various apparatuses including the portable information processing device 1 according to the first embodiment of the present invention are interconnected with each other by a home network consisting of a wired LAN, a wireless LAN or a combination of these, as shown in FIG. 1. These apparatuses correspond to the DLNA (Digital Living Network Alliance). The DLNA is a network standard allowing sharing of media data between network-connected corresponding apparatuses, and these corresponding apparatuses can mutually make communication based on the DLNA standard.

According to the first embodiment, the portable information processing device 1, a media-possessing apparatus 2 possessing media data, a television set (TV set) 3 capable of playing back/displaying media data related to contents of a picture, an image and the like and a router 4 for connecting the home network system to the Internet are included as DLNA apparatuses constituting the home network system. A non-DLNA television set (TV set) 5 is directly connected to the portable information processing device 1 by an HDMI (High-Definition Multimedia Interface) cable 100. The HDMI is an interface standard capable of connecting two apparatuses with each other by a prescribed cable (HDMI cable) capable of transmitting sound data, picture data and a control signal and performing a cooperative operation between the apparatuses. An apparatus such as a personal computer, a hard disk recorder or a digital camera possessing media data related to contents of a picture, an image etc. is included as the media-possessing apparatus 2. This home network system is capable of acquiring contents (media data) on the Internet by being connected to the Internet through the router 4. The media-possessing apparatus 2 is an example of the "digital media server" or the "DLNA apparatus" in the present invention, and the television set 5 is an example of the "external display device" in the present invention.

The portable information processing device 1 is formed to be capable of causing the non-DLNA television set 5 HDMI-connected to the portable information processing device 1 to play back/display media data acquired from the media-possessing apparatus 2 which is a DLNA apparatus through the home network by communication based on the DLNA standard. In this case, the portable information processing device 1 is formed to be capable of causing the built-in display portion 10 to display (mirror-display) the same media data as the television set 5 and to be also capable of making a display as a digital media controller described later on the built-in display portion 10. Further, the portable information processing device 1 is formed to be capable of acquiring media data from a built-in memory (flash memory 18*b*) described later or an SD card 50 connected to an SD card connection portion 14 and causing the non-DLNA television set 5 to play back/display the media data. In addition, the portable information processing device 1 is also capable of causing the television set 3 to play back/display media data of the media-possessing apparatus 2 similarly to an ordinary DLNA apparatus, and so formed that the display as the digital media controller is made on the built-in display portion 10 in this case.

Functions of the respective DLNA apparatuses in the home network according to the DLNA are now described. The media-possessing apparatus 2 functions as a digital media server (hereinafter referred to as DMS) as a supply source for media data in the home network. The television set 3 functions as a digital media renderer (hereinafter referred to as DMR) as a display portion in the home network. The portable information processing device 1 functions as a digital media player (DMP) directly acquiring media data from the DMS and causing the built-in display portion 10 to play back/display the same, and also functions as a digital media controller (DMC) causing the digital media renderer (DMR) to display media data acquired from the digital media server (DMS). According to the first embodiment, the portable information processing device 1 is formed to pseudoly function as the DMC also with respect to the HDMI-connected non-DLNA television set 5, in addition to the functions of the DMP and the DMC as the aforementioned ordinary DLNA apparatus. In other words, the portable information processing device 1 is capable of causing the HDMI-connected non-DLNA television set 5 to play back/display media data acquired from the DMS on the basis of the DLNA standard and causing the built-in display portion 10 of the portable information processing device 1 to make a display as the DMC.

As hereinabove described, the portable information processing device 1 according to the first embodiment functions as the DMP and also functions as the DMC in the home network system employing the DLNA apparatuses, depending on the situation such as the location of media data to be played back/displayed and the playback/display destination thereof etc. The portable information processing device 1 is capable of playing back/displaying media data (content) possessed by itself due to its own playback/display function, also in a case where the same is not connected to the home network.

These DLNA apparatuses mutually communicate with each other through the home network, and the portable information processing device 1 as the DMC or the DMP is capable of recognizing media data present in the DMS in the home network at any time. Further, the portable information processing device 1 is capable of recognizing media data possessed by its built-in memory (flash memory 18*b* described later) and media data possessed by a recording medium (the SD card 50 described later, a USB memory or the like) connected thereto. In other words, the portable information processing device 1 recognizes all of media data accessible by itself at any time, is capable of acquiring the media data through the home network or from the built-in memory (flash memory 18*b*) or the recording medium, and is capable of playing back/displaying the same on the DMR of itself or in the home network or on the HDMI-connected external display device (television set 5).

Further, the portable information processing device 1 according to the first embodiment is formed to be Internet-connectable through the router 4 of the home network, and formed to be capable of using an electronic mail, a video chat, a voice chat and an IP telephone function etc. by performing Internet connection. In addition, the portable information processing device 1 functions as a remote control of audio apparatuses (not shown) also in a case of not performing Internet connection, and is so formed that the portable information processing device 1 itself is usable as an audiovisual apparatus (AV apparatus).

Figure 2:
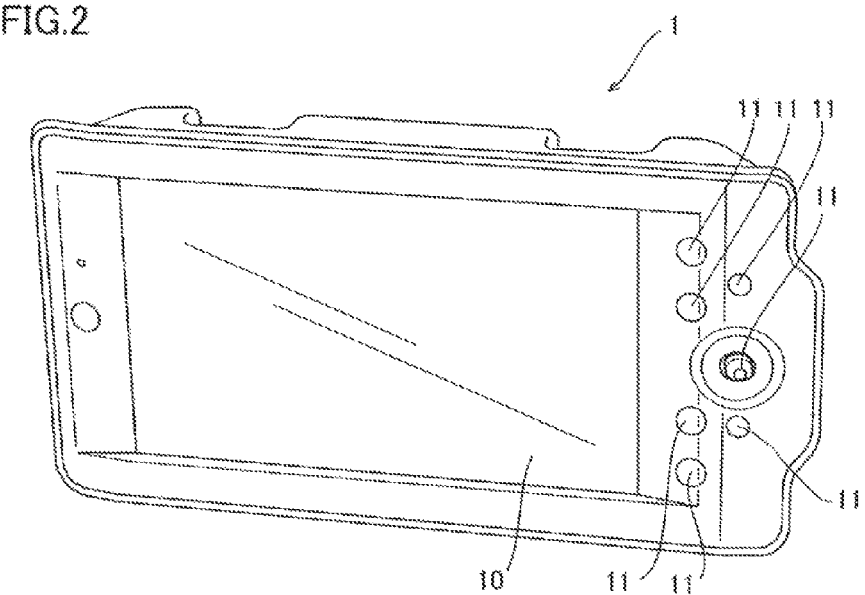
FIG. 2 A perspective view showing an outline of the portable information processing device according to the first embodiment of the present invention.
Figure 3:
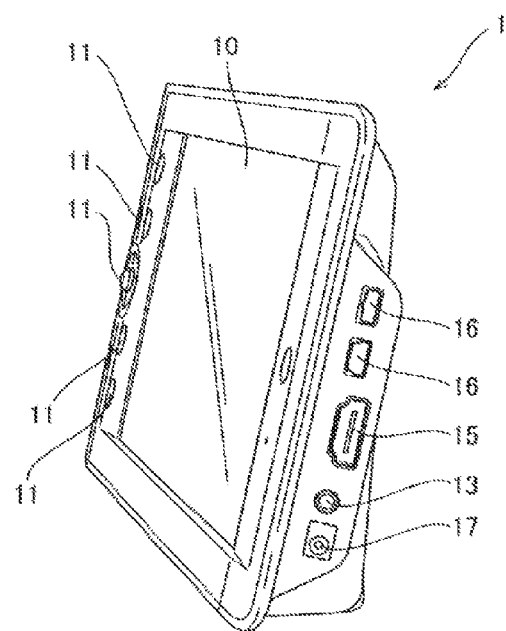
FIG. 3 A perspective view showing the outline of the portable information processing device according to the first embodiment of the present invention.
Figure 4:
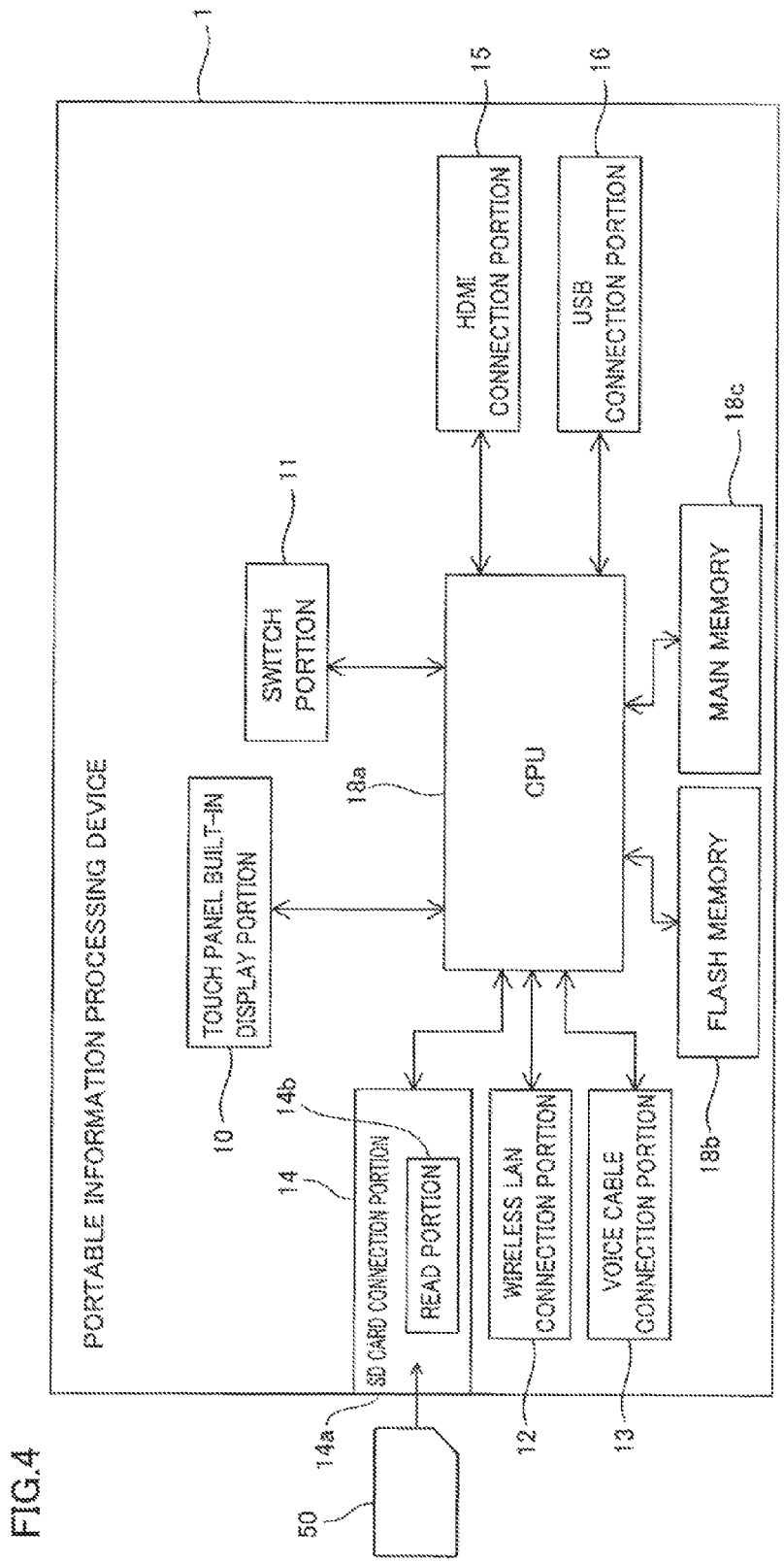
FIG. 4 A block diagram showing the structure of the portable information processing device according to the first embodiment of the present invention.

The structure of the portable information processing device 1 according to the first embodiment is now described. As shown in FIGS. 2 to 4, the portable information processing device 1 according to the first embodiment includes the built-in display portion 10 displaying information. The built-in display portion 10 has a touch panel function as shown in FIG. 4, and is so formed that the user presses down operation buttons on a screen displayed on the built-in display portion 10 so that an operation according to an application is possible. Particularly according to the first embodiment, the built-in display portion 10 is so formed that all or part of media data (contents) accessible by the portable information processing device 1 are list-displayed on the built-in display portion 10 by an operation of the user and the user is capable of selecting a content to be played back/displayed from the list. In a case where there is a plurality of playback/display destinations (the built-in display portion 10 of the portable information processing device 1, the television set 3 as the DMR and the HDMI-connected television set 5 etc., for example), the user is also capable of selecting the playback/display destination (the built-in display portion 10, the television set 3 as the DMR or the HDMI-connected television set 5 in the aforementioned example) for the content by an operation of the touch panel in the portable information processing device 1.

As shown in FIGS. 2 to 4, the portable information processing device 1 further includes a switch portion 11, a wireless LAN connection portion 12 (see FIG. 4), a voice cable connection portion 13 (see FIGS. 3 and 4), the SD card connection portion 14 (see FIG. 4), an HDMI connection portion 15 (see FIGS. 3 and 4), USB connection portions 16 (see FIGS. 3 and 4) and a power supply connector 17 (see FIG. 3).

The switch portion 11 is provided for performing an operation of switching respective modes (a remote control mode, a media player mode etc.) of the portable information processing device 1. The wireless LAN connection portion 12 is provided for connecting the portable information processing device 1 to the home network. The wireless LAN connection portion 12 is an example of the "communication portion" in the present invention. The SD card connection portion 14 has a card slot 14a into which the SD card 50 is insertable and a read portion 14b reading data such as media data stored in the SD card 50 inserted into the card slot 14a. The SD card connection portion 14 is an example of the "recording medium connection portion" in the present invention, and the SD card 50 is an example of the "portable recording medium" in the present invention.

The HDMI connection portion 15 is formed to be directly connectable with the television set 5 without through the home network. Further, the HDMI connection portion 15 is formed to be capable of transmitting a picture and sound data to the television set 5 noncorresponding to the DLNA through the HDMI cable 100 (see FIG. 1). The HDMI connection portion 15 is an example of the "external display device connection portion" in the present invention.

The two USB connection portions 16 are provided to be connected with external storage units (not shown) such as a USB memory and a hard disk through unshown USB cables, and the portable information processing device 1 is capable of reading data such as media data stored in the external storage units. It is also possible to perform transmission/receiving of data or the like between an external apparatus and the portable information processing device 1 by connecting the portable information processing device 1 to the external apparatus such as a personal computer by employing either USB connection portion 16. The USB connection portions 16 are examples of the "recording medium connection portion" in the present invention, and the external storage units such as the USB memory and the hard disk are examples of the "portable recording medium" in the present invention. The voice cable connection portion 13 is so formed that an earphone (not shown) or a headphone (not shown) is connectable thereto. The power supply connector 17 is provided for incorporating electric power into the portable information processing device 1.

Further, the portable information processing device 1 includes a CPU 18a, the flash memory 18b and a main memory 18c, as shown in FIG. 4. The CPU 18a is capable of reading programs stored in the flash memory 18b on the main memory 18c and running the same. Not only program data but also media data playbackable/displayable on the built-in display portion 10 etc. are stored in the flash memory 18b. According to the first embodiment, the CPU 18a is formed to perform control of recognizing accessible media data at any time and list-displaying media data (contents) in response to an operation of the user. Further, the CPU 18a is formed to perform control of acquiring media data of a content selected by the user and playing back/displaying the content on the built-in display portion 10. In addition, the CPU 18a is formed to transmit media data (content) to another display/playback apparatus (the DLNA television set 3 or the non-DLNA television set 5 or the like) and cause the other display/playback apparatus to play back/display the same. The CPU 18a is an example of the "control portion" in the present invention, and the flash memory 18b is an example of the "built-in memory" in the present invention.

According to the first embodiment, the CPU 18a is formed to be capable of switching the mirror display mode causing the HDMI-connected non-DLNA television set 5 to display the same data as data displayed on the built-in display portion 10 and the expanded display mode causing the television set 5 to display data and causing the built-in display portion 10 to display data different from the data displayed on the television set 5. More detailedly, the CPU 18a is formed to select the expanded display mode from the mirror display mode and the expanded display mode on the basis of that the television set 5 is connected to the HDMI connection portion 15 and the media player is being started, as described later.

Display modes related to playback/display of media data (content) in the portable information processing device 1 according to the first embodiment are now described with reference to FIGS. 5 to 9.

The portable information processing device 1 is formed to recognize media data acquired from the DMS through the home network, media data stored in the built-in memory (flash memory 18b) of the portable information processing device 1, media data stored in the external storage unit such as the hard disk connected to either USB connection portion 16 or media data stored in the SD card 50 connected to the SD card connection portion 14 at any time and to make a display as the DMC related to the recognized media data on the built-in display portion 10.

Figure 5:
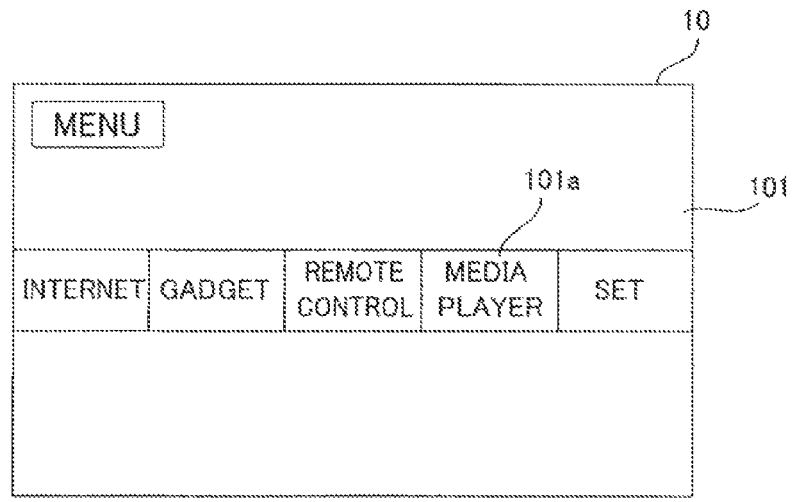
FIG. 5 A diagram showing a menu screen displayed on a built-in display portion of the portable information processing device according to the first embodiment of the present invention.
Figure 6:
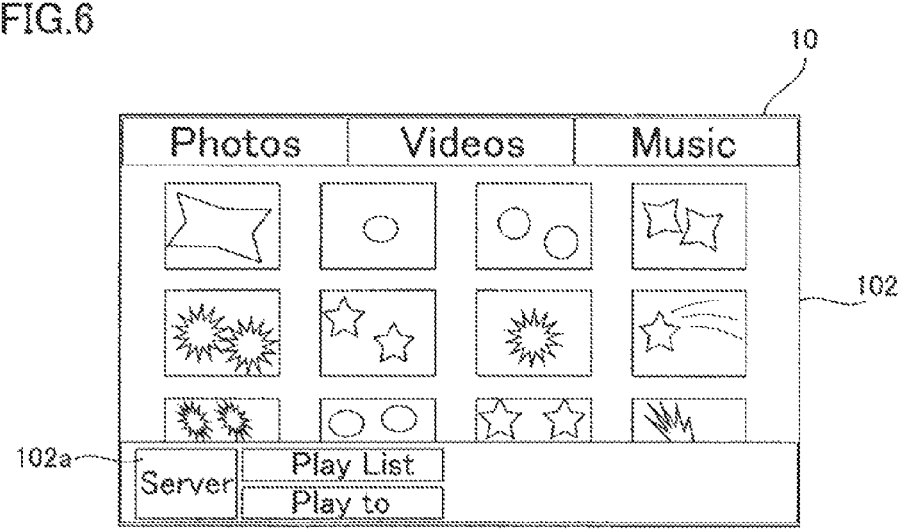
FIG. 6 A diagram showing a content list display screen displayed on the built-in display portion of the portable information processing device according to the first embodiment of the present invention.

More specifically, the portable information processing device 1 is formed, when a media player 101a is selected from among a plurality of applications on a menu screen 101 shown in FIG. 5, to display a content list display screen 102 which is a display as the DMC, as shown in FIG. 6. The user is capable of causing the portable information processing device 1 to list-display contents (media data) (list-display the contents with a thumbnail) stored in a prescribed storage place (the DMS 2, the built-in memory (flash memory 18b), the external storage unit, the SD card 50 or the like) by pressing down a media roller 102a on the content list display screen 102. The portable information processing device 1 is formed, in a case where a content to be played back/displayed is selected by the user from among the contents list-displayed on the built-in display portion 10, to play back/display the selected content. In other words, the portable information processing device 1 is formed to accept a playback instruction for the content of the media player through the content list display screen 102. Further, the portable information processing device 1 is formed to cause any one of the built-in display portion 10 thereof, the DLNA television set (TV set) 3 connected to the home network and the non-DLNA television set (TV set) 5 HDMI-connected to the portable information processing device 1 to play back/display the selected content in response to the situation, as described later.

Figure 9:
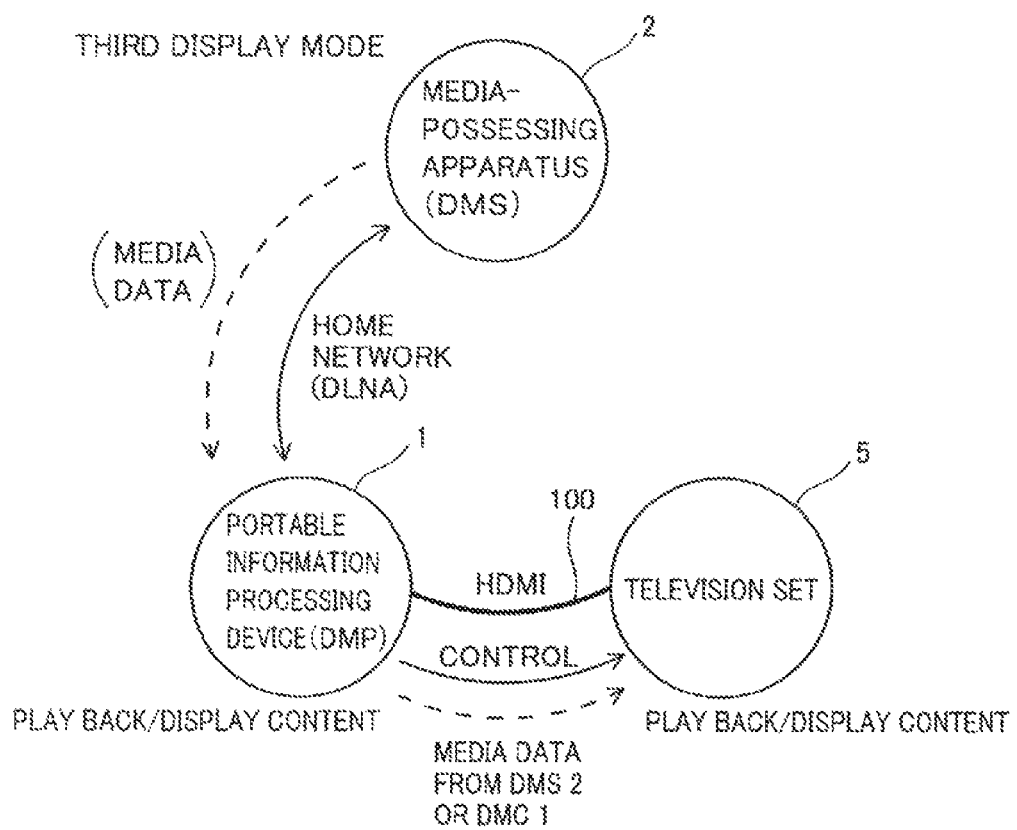
FIG. 9 A diagram for illustrating still another display mode (third display mode) of the home network system shown in FIG. 1.

In the home network system employing the portable information processing device 1 according to the first embodiment, it is possible to take a plurality of display modes by combining the content list display screen 102 (see FIG. 6) and playback/display of a content in this portable information processing device 1 and playback/display of a content on the external television set 3 or the television set 5. More specifically, the portable information processing device 1 is capable of mainly taking a first display mode (display mode according to an original DLNA function shown in FIG. 7) employing the DLNA television set 3 connected to the home network as the DMR, a second display mode (display mode according to a pseudo DLNA function shown in FIG. 8) employing the non-DLNA television set 5 HDMI-connected to the portable information processing device 1 as a pseudo DMR and a third display mode, shown in FIG. 9, playing back/displaying a content in the portable information processing device 1 by its own playback/display function, as shown in FIGS. 7 to 9. These first to third display modes are described in detail in the following description of content playback processing.

The content playback processing of the portable information processing device 1 according to the first embodiment of the present invention is now described with reference to FIG. 10.

Figure 10:
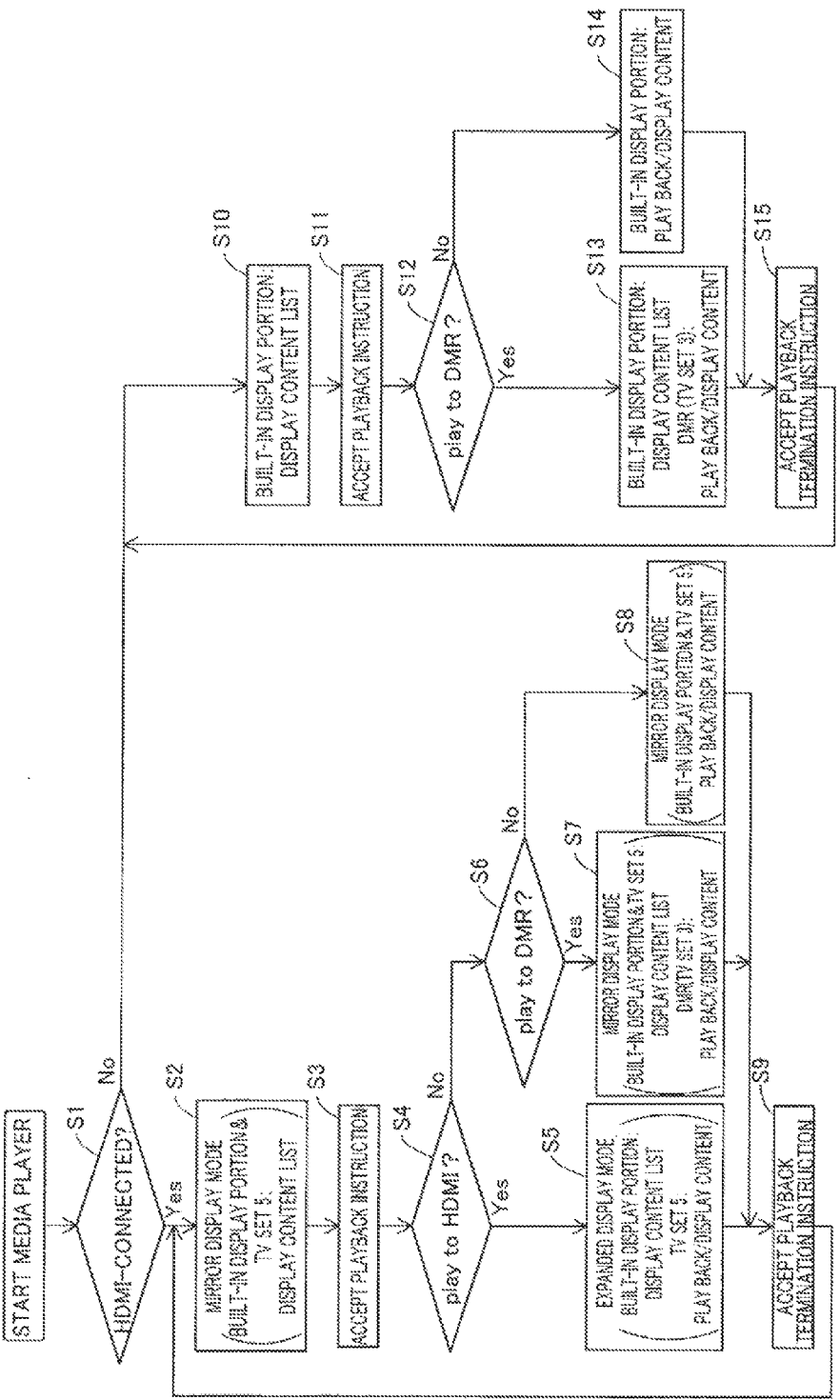
FIG. 10 A flow chart for illustrating content playback processing of the portable information processing device according to the first embodiment of the present invention.
Figure 11:
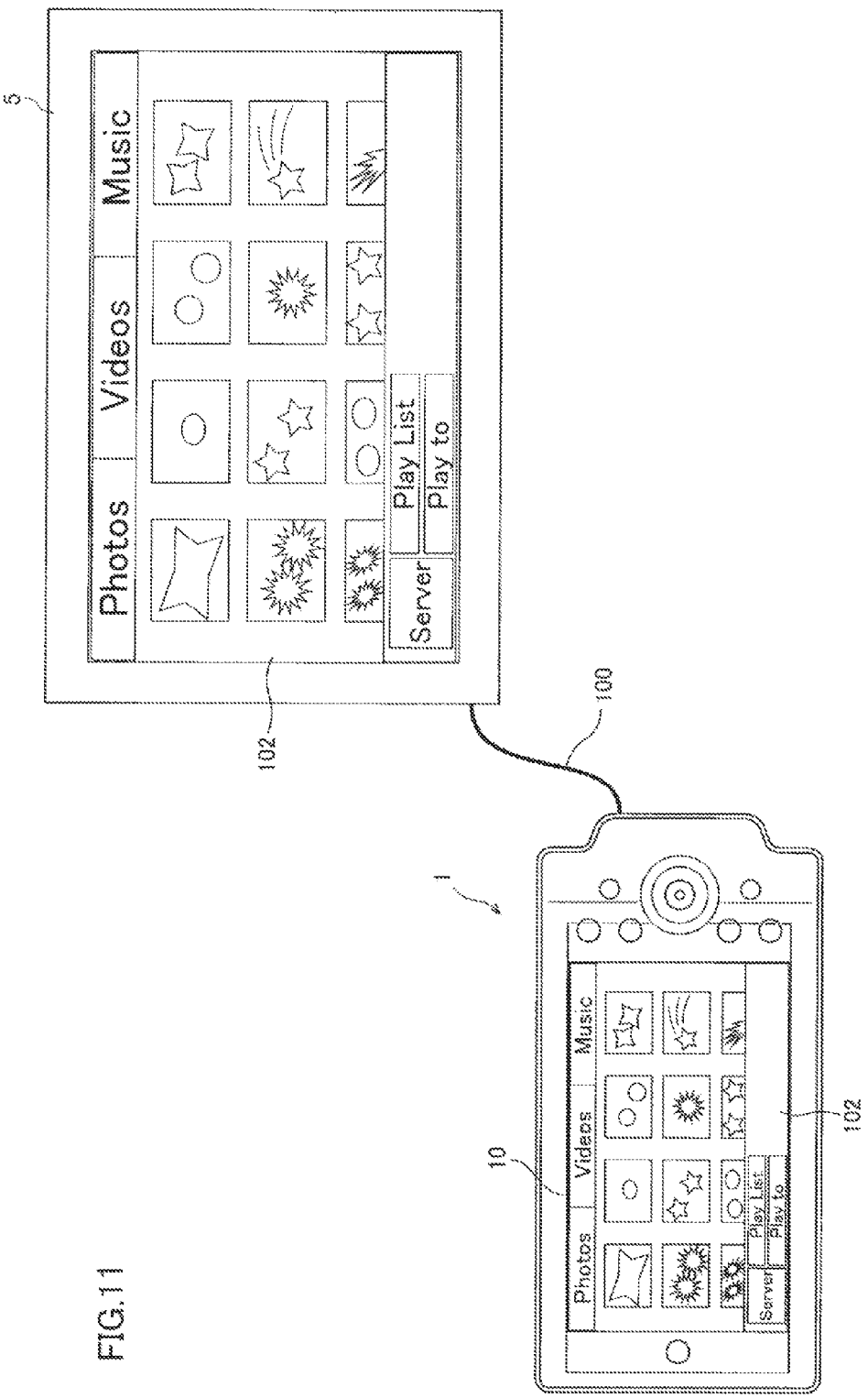
FIG. 11 A diagram showing a state causing the built-in display portion of the portable information processing device according to the first embodiment of the present invention and a television set to mirror-display the content list display screen.

When the media player 101a is selected (media player is started) by the user on the menu screen 101 shown in FIG. 5, the content playback processing shown in FIG. 10 is executed. First, the CPU 18a determines whether or not the television set 5 noncorresponding to the DLNA is connected to the HDMI connection portion 15 at a step S1 in FIG. 10. In a case where the television set (TV set) 5 is connected, the CPU 18a causes both of the built-in display portion 10 and the HDMI-connected television set 5 to mirror-display the content list display screen 102 according to the mirror display mode at a step S2, as shown in FIG. 11. At a step S3, the CPU 18a accepts a playback instruction for the content by the user. The user is capable of issuing a playback instruction for any one of the aforementioned first to third display modes (see FIGS. 7 to 9) through the content list display screen 102 displayed on the touch panel built-in display portion 10.

Figure 12:
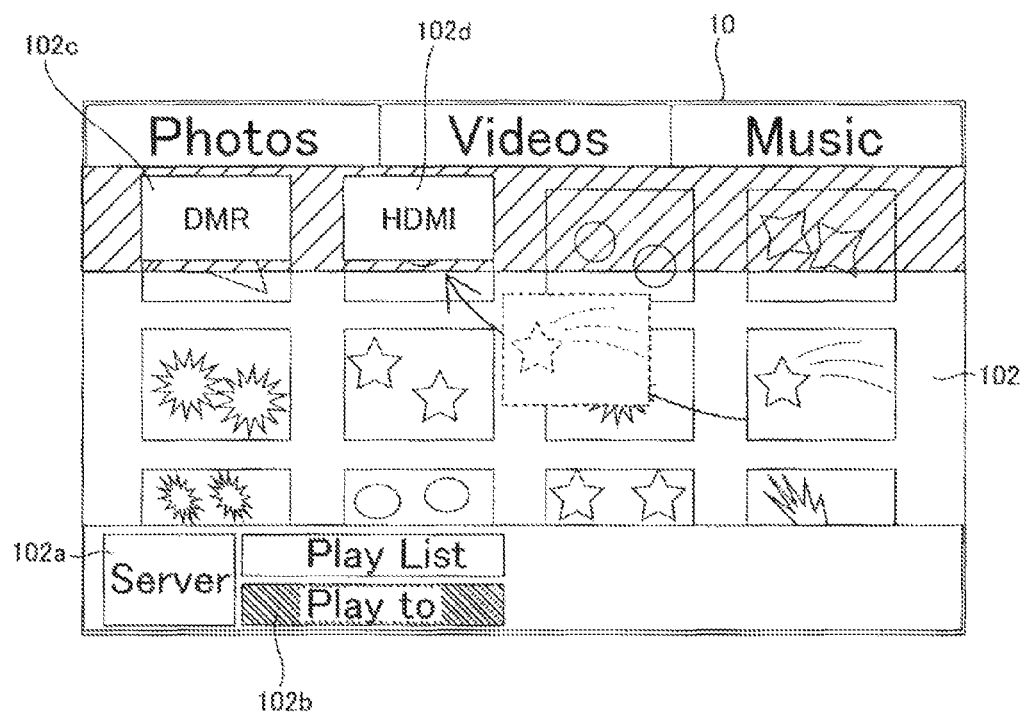
FIG. 12 A diagram for illustrating a playback operation for the content of a media player with respect to the portable information processing device according to the first embodiment of the present invention.

More specifically, the user list-displays the contents of the prescribed storage place (the DMS 2, the built-in memory (flash memory 18b), the external storage unit, the SD card 50 or the like) by pressing down the media roller 102a and thereafter displays output destinations (a DMR icon 102c and an HDMI icon 102d) by pressing down a Play to button 102b, as shown in FIG. 12. Then, the user is enabled to obtain the first display mode (see FIG. 7) employing the DLNA television set 3 connected to the home network as the DMR by selecting a prescribed content (content stored in the flash memory 18b of the portable information processing device 1, the SD card 50 or the DMS 2) from among the list-displayed plurality of contents and dropping the same onto the DMR icon 102c. Further, the user is capable of obtaining the second display mode (see FIG. 8) employing the non-DLNA television set 5 HDMI-connected to the portable information processing device 1 as the pseudo DMR by selecting a desired content (content stored in the flash memory 18b of the portable information processing device 1, the SD card 50 or the DMS 2) from among the list-displayed plurality of contents and dropping the same onto the HDMI icon 102d. In addition, the user is capable of, by selecting a desired content (content stored in the flash memory 18b of the portable information processing device 1, the SD card 50 or the DMS 2) from among the list-displayed plurality of contents and double-tapping (double-clicking) the same, obtaining the third display mode (see FIG. 9) playing back/displaying the content in the portable information processing device 1 by its own playback/display function.

Figure 13:
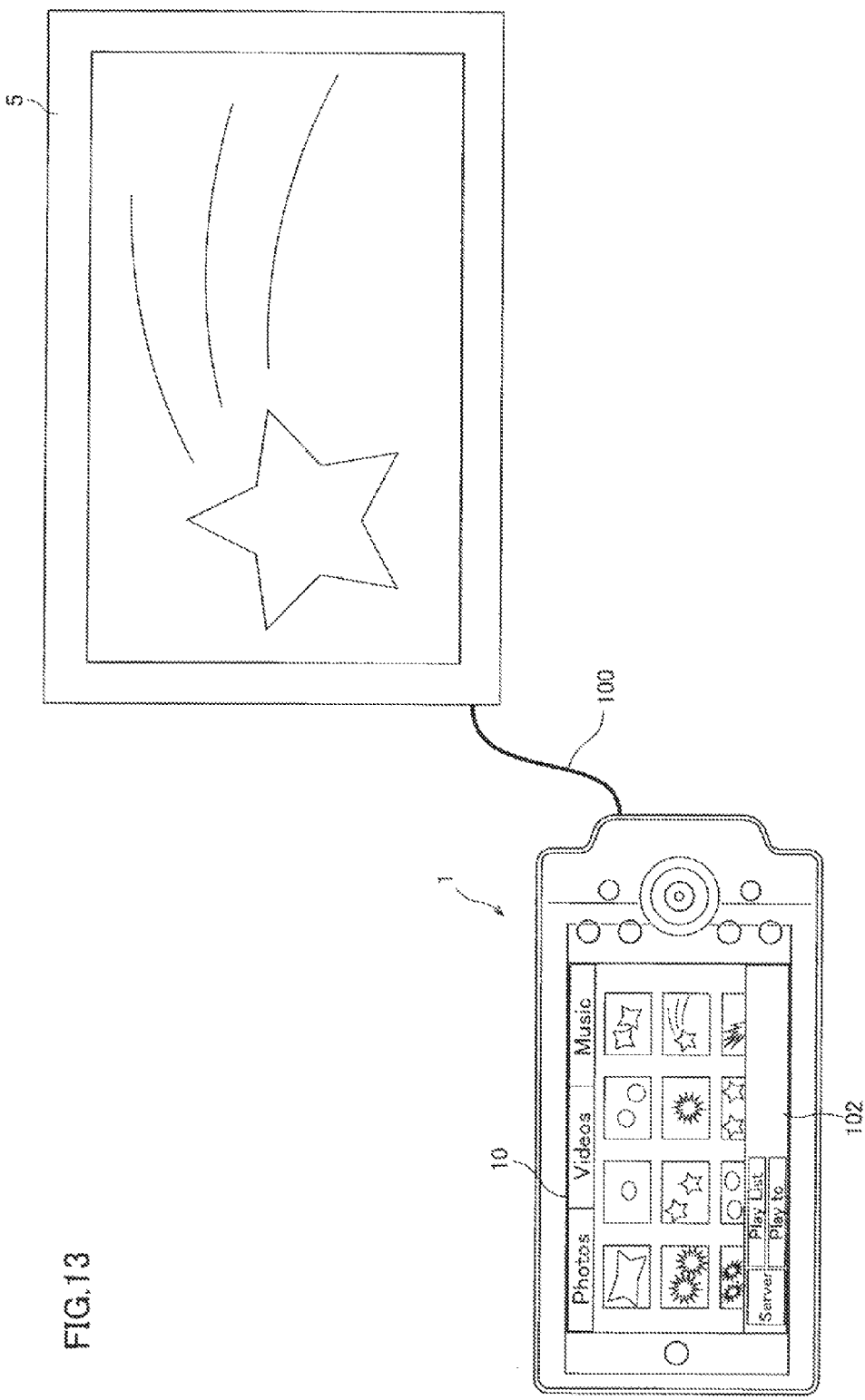
FIG. 13 A diagram showing a state causing the respective ones of the built-in display portion of the portable information processing device according to the first embodiment of the present invention and the television set to expanded-display the content list display screen and the content of the media player.

When accepting the playback instruction at the step S3, the CPU 18a determines whether or not the content of the playback instruction is Play to HDMI (second display mode employing the HDMI-connected television set 5 as the pseudo DMR) at a step S4. In a case where the instruction content is Play to HDMI, the CPU 18a selects the expanded display mode at a step S5. In other words, the CPU 18a selects the expanded display mode in response to that the user has selected the desired content and dropped the same onto the HDMI icon 102d. At this time, the CPU 18a causes the HDMI-connected television set 5 to play back/display the selected content in a state causing the built-in display portion 10 to display the content list display screen 102 as a display of the DMC according to the expanded display mode, as shown in FIG. 13. In other words, a display as the pseudo DMC is performed on the portable information processing device 1 while the content selected by the user is played back/displayed on the television set 5. Thus, the user's use feelings (operation results such as the operation content of the user on the portable information processing device 10 and the playback/display resulting from the operation etc.) are identical in the instruction of Play to HDMI and an instruction of Play to DMR described later, and this point becomes a characteristic advantage for the user in the case of employing the portable information processing device 1 according to the first embodiment.

In a case where the user selects media data in the media-possessing apparatus 2 at this time, the media data cannot be directly transmitted to the television set 5 not connected to the home network from the media-possessing apparatus (DMS) 2 as shown in FIG. 8, and hence the portable information processing device 1 acquires the selected media data from the media-possessing apparatus 2, transmits the acquired media data to the television set 5 through the HDMI cable 100, and causes the television set 5 to play back/display the media data (content). In a case where the user selects media data stored in the flash memory 18b in the portable information processing device 1 or the SD card 50, the portable information processing device 1 transmits the selected media data to the television set 5 and causes the television set 5 to play back/display the media data (content).

In a case where the instruction content is not Play to HDMI, the CPU 18a determines whether or not the instruction content is Play to DMR (first display mode employing the DLNA television set 3 connected to the home network as the DMR) at a step S6. If the instruction content is Play to DMR, the CPU 18a selects the mirror display mode at a step S7. More detailedly, the CPU 18a causes the DLNA television set (DMR) 3 connected to the home network to play back/display the content selected by the user in a state causing both of the built-in display portion 10 and the HDMI-connected television set 5 to display the content list display screen 102 as the display of the DMC according to the mirror display mode, as shown in FIG. 11. In other words, the portable information processing device 1 and the DLNA television set 3 become the DMC (digital media controller) and the DMR respectively as shown in FIG. 7, and the media data is played back/displayed on the DMR (DLNA television set 3 in the first embodiment) connected to the home network. On the HDMI-connected television set 5, the content list display screen 102 is displayed, similarly to the built-in display portion 10 of the portable information processing device 1 as the DMC.

Figure 14:
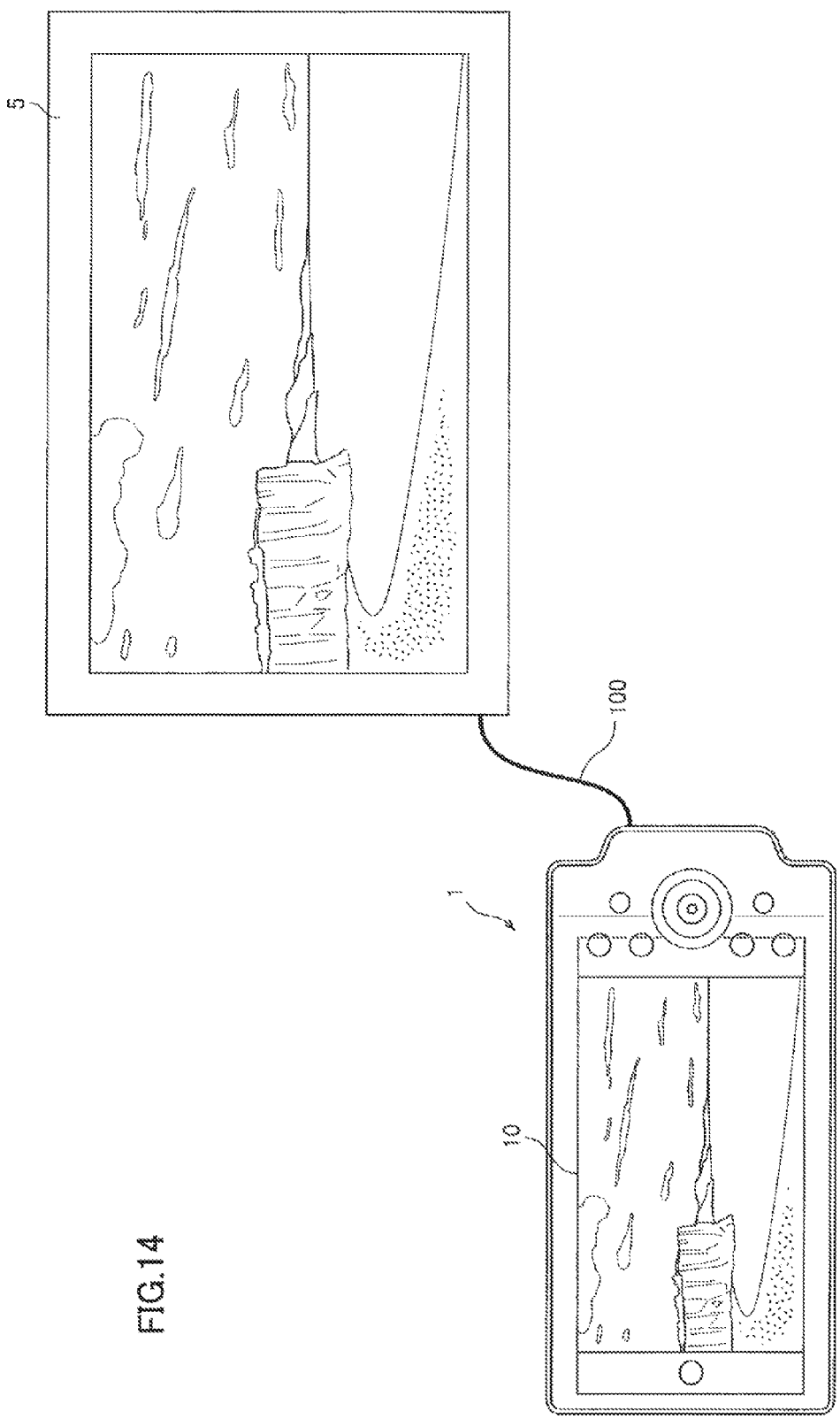
FIG. 14 A diagram showing a state causing the built-in display portion of the portable information processing device according to the first embodiment of the present invention and the television set to mirror-display the content of the media player.

In a case where the instruction content is not Play to DMR at the step S6, the CPU 18a assumes that the instruction content is the third display mode playing back/displaying the content in the portable information processing device 1 by its own playback/display function and selects the mirror display mode at a step S8. More detailedly, the CPU 18a causes both of the built-in display portion 10 and the HDMI-connected television set 5 to play back/display the content selected by the user according to the mirror display mode, as shown in FIG. 14.

In a case where the user selects media data in the media-possessing apparatus 2 at this time, the portable information processing device 1 acquires the selected media data from the media-possessing apparatus 2 through the home network, transmits the media data to the television set 5 through the HDMI cable 100 while playing back/displaying the acquired media data (content) on the built-in display portion 10, and causes the television set 5 to play back/display the transmitted media data (content), as shown in FIG. 9. In a case where the user selects media data stored in the flash memory 18b in the portable information processing device 1 or the SD card 50, the portable information processing device 1 transmits the selected media data to the television set 5 through the HDMI cable 100 while playing back/displaying the selected media data (content) and causes the television set 5 to play back/display the transmitted media data (content). In this case, the portable information processing device 1 itself functions as the DMP (digital media player) playing back/displaying the content.

After the aforementioned step S5, the step S7 or the step S8, the CPU 18a accepts a playback termination instruction for the content at a step S9, and returns to the operation (see FIG. 11) of causing both of the built-in display portion 10 and the HDMI-connected television set 5 to mirror-display the content list display screen 102 at the step S2. In other words, the CPU 18a causes both of the built-in display portion 10 and the HDMI-connected television set 5 to display the content list display screen 102 while switching the portable information processing device 1 from the expanded display mode to the mirror display mode or in a state maintaining the mirror display mode on the basis of that the playback operation for the content has terminated.

In a case where the television set 5 noncorresponding to the DLNA is not connected to the HDMI connection portion 15 when the media player 101a has been selected (media player has been started) by the user on the menu screen 101 shown in FIG. 5, on the other hand, the CPU 18a causes the built-in display portion 10 to display the content list display screen 102 (see FIG. 12) at a step S10 shown in FIG. 10. Then, the CPU 18a accepts a playback instruction for the content by the user at a step S11. Also when the Play to button 102b is pressed down by the user at this time, only the DMR icon 102c is displayed as an output destination, and the HDMI icon 102d is not displayed. In other words, the user cannot select (instruct) Play to HDMI.

The CPU 18a determines whether or not the instruction content is Play to DMR (first display mode employing the DLNA television set 3 connected to the home network as the DMR) at a step S12. If the instruction content is Play to DMR, the CPU 18a cases the DLNA television set 3 connected to the home network to play back/display the content selected by the user in a state causing the built-in display portion 10 to display the content list display screen 102 at a step S13.

In a case where the instruction content is not Play to DMR, the CPU 18a assumes that the instruction content is the third display mode playing back/displaying the content in the portable information processing device 1 by its own playback/display function and causes the built-in display portion 10 to play back/display the content selected by the user at a step S14.

After the aforementioned step S13 or the step S14, the CPU 18a accepts a playback termination instruction for the content at a step S15, and returns to the operation of causing the built-in display portion 10 to display the content list display screen 102 at the step S10. The content playback processing of the portable information processing device 1 according to the first embodiment of the present invention is performed in the aforementioned manner.

Processing in an HDMI-connected case of the portable information processing device 1 according to the first embodiment of the present invention is now described with reference to FIG. 15.

Figure 15:
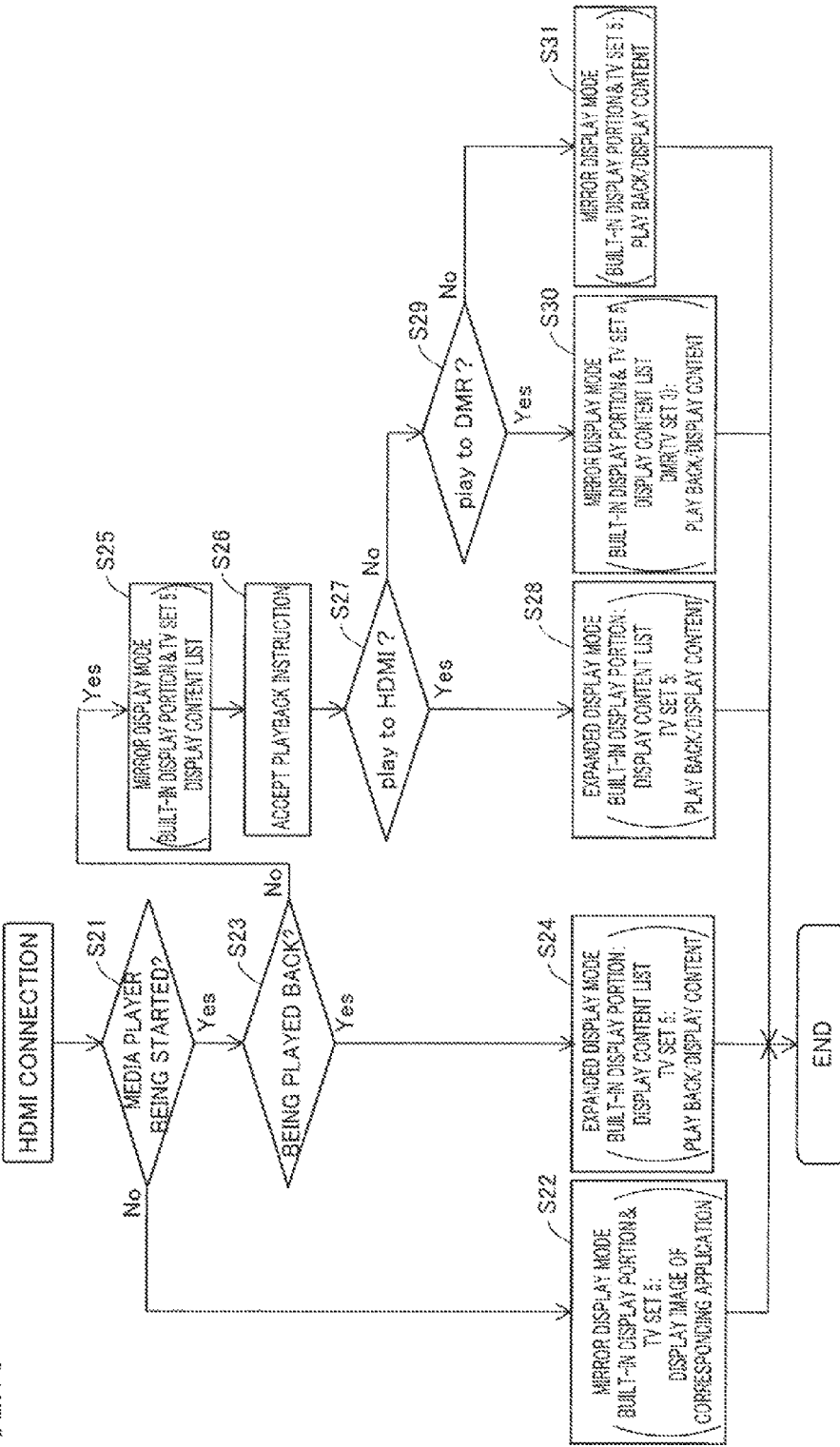
FIG. 15 A flow chart for illustrating processing in a case where the built-in display portion of the portable information processing device according to the first embodiment of the present invention is HDMI-connected.
Figure 16:
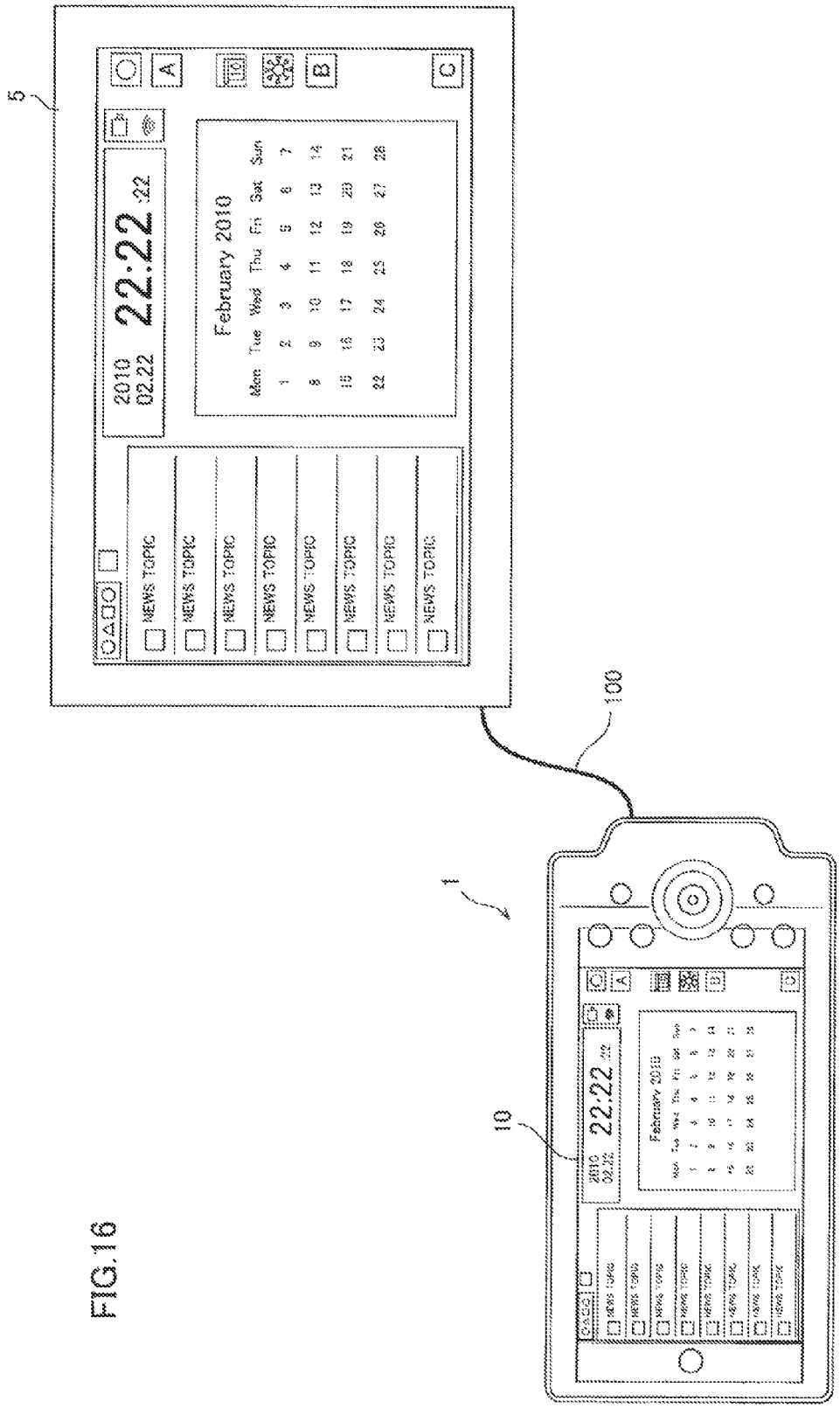
FIG. 16 A diagram showing a state causing the built-in display portion of the portable information processing device according to the first embodiment of the present invention and the television set to mirror-display an image of an application other than that of the media player.

When the television set 5 noncorresponding to the DLNA is connected to the HDMI connection portion 15 by the user, the processing in the HDMI-connected case shown in FIG. 15 is executed. First, the CPU 18a determines whether or not the media player is being started at a step S21 of FIG. 15. In a case where the media player is not being started, the CPU 18a selects the mirror display mode at a step S22. In other words, the CPU 18a causes both of the built-in display portion 10 and the HDMI-connected television set 5 to display the same image of the corresponding application according to the mirror display mode as shown in FIG. 16, in a case where the media player is not being started but an application other than the media player is being started. Thus, the user is enabled to observe the image of the desired application on both display portions of the built-in display portion 10 of the portable information processing device 1 at hand and the television set 5, whereby this is effective in a case where a plurality of persons wish to observe a large image, for example.

In a case where the media player is being started, the CPU 18a determines whether or not the content is being played back at a step S23. In a case where the content is being played back, the CPU 18a selects the expanded display mode at a step S24. In other words, the CPU 18a causes the HDMI-connected television set 5 to play back/display the content selected by the user in a state causing the built-in display portion 10 to display the content list display screen 102 as the display of the DMC according to the expanded display mode as shown in FIG. 13, similarly to the aforementioned operation at the step S5 in FIG. 10.

In a case where the content is not being played back while the media player is being started, on the other hand, the CPU 18a selects the mirror display mode at a step S25, and causes both of the built-in display portion 10 and the HDMI-connected television set 5 to display the content list display screen 102, as shown in FIG. 11. Thereafter the CPU 18a accepts a playback instruction for the content by the user at a step S26, and plays back/displays the content selected by the user in the display mode responsive to the instruction content in subsequent steps. More specifically, the CPU 18a performs operations similar to the contents in the steps S4, S5, S6, S7 and S8 of the aforementioned content playback processing shown in FIG. 10 at steps S27, S28, S29, S30 and S31 respectively, and terminates the processing in the HDMI-connected case.

Processing in a case where the portable information processing device according to the first embodiment of the present invention is HDMI-disconnected is described with reference to FIG. 17.

Figure 17:
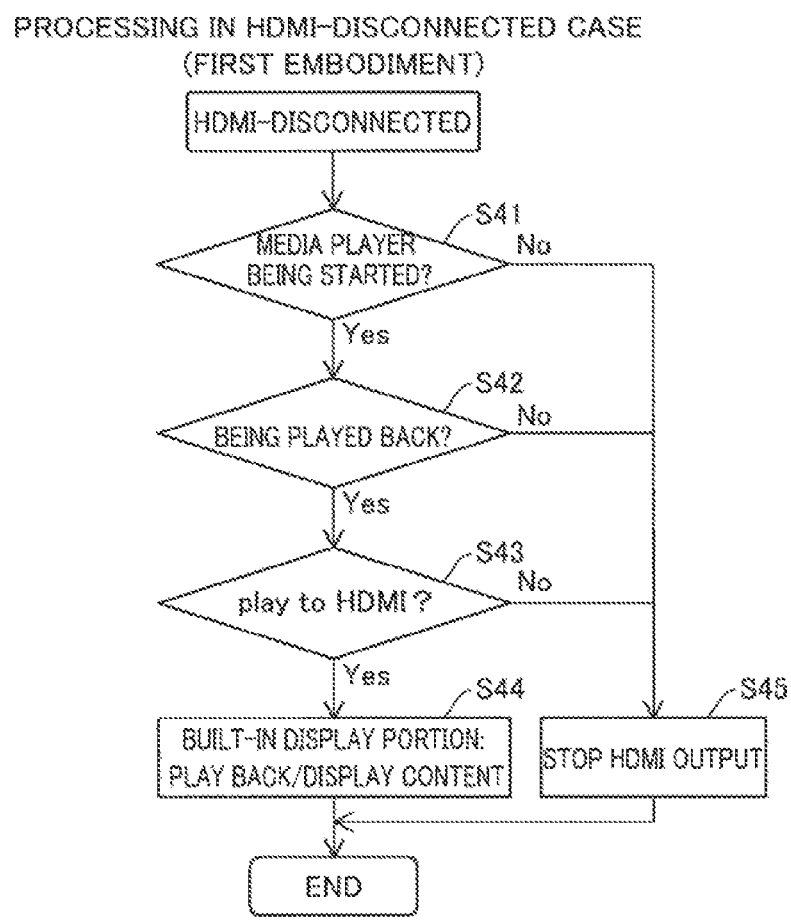
FIG. 17 A flow chart for illustrating processing in a case where the portable information processing device according to the first embodiment of the present invention is HDMI-disconnected.

When the television set 5, noncorresponding to the DLNA, connected to the HDMI connection portion 15 is disconnected from the HDMI connection portion 15 by the user, the processing in the HDMI-disconnected case shown in FIG. 17 is executed. First, the CPU 18a determines whether or not the media player is being started at a step S41 in FIG. 17. In a case where the media player is being started, the CPU 18a determines whether or not a content is being played back at a step S42. In a case where the content is being played back, the CPU 18a determines whether or not the content is played back in Play to HDMI (second display mode employing the HDMI-connected television set 5 as the pseudo DMR) at a step S43, and causes the built-in display portion 10 to play back/display the content at a step S44 in a case where the same is being played back in Play to HDMI. In other words, the CPU 18a switches the display of the built-in display portion 10 from the content list display screen 102 to a playback image of the content being played back in a case where the content is being played back in Play to HDMI, and the content list display screen 102 is displayed on the built-in display portion 10 while the content is played back/displayed on the HDMI-connected television set 5 as shown in FIG. 13. Thus, also in a case where the HDMI-connected television set 5 having played back/displayed the content enters a disconnected state, the content is played back/displayed on the built-in display portion 10, and hence the user can observe the playback image of the content on the built-in display portion 10.

In a case where the media player is not being started, a case where the media player is being started while the content is not being played back, or a case where the content is being played back in a display mode other than Play to HDMI (second display mode employing the HDMI-connected television set 5 as the pseudo DMR) upon HDMI disconnection, the CPU 18a stops transmission (outputting) of picture and sound data from the HDMI connection portion 15 to the television set 5 without changing the display on the built-in display portion 10. The processing in the case where the portable information processing device 1 according to the first embodiment of the present invention is HDMI-disconnected is performed in the aforementioned manner.

According to the first embodiment, as hereinabove described, the CPU 18a selecting the expanded display mode from the mirror display mode causing the built-in display portion 10 to display data while causing the television set 5 to display the same data as the data displayed on the built-in display portion 10 and the expanded display mode causing the television set 5 to display data while causing the built-in display portion 10 to display data different from the data displayed on the television set 5 at least on the basis of that the television set 5 is connected to the HDMI connection portion 15 and the media player is being started is provided. Thus, the expanded display mode is selected in a case where it is preferable to bring the portable information processing device 1 into the expanded display mode in response to the situation, whereby the display modes (the mirror display mode and the expanded display mode) of the built-in display portion 10 and the television set 5 can be selectively distinguishably used. Further, the expanded display mode is automatically selected from the mirror display mode and the expanded display mode by the CPU 18a at least on the basis of that the television set 5 is connected to the HDMI connection portion 15 and the media player is being started, whereby the user does not perform a mode selecting operation, but the expanded display mode is selected in the case where the media player is being started and the mirror display mode is selected in a case of another application. Thus, an operational burden resulting from the user's mode selecting operation can be reduced, whereby convenience can be improved.

According to the first embodiment, as hereinabove described, the CPU 18a is formed to cause the television set 5 to display the content (media data) of the media player and to cause the built-in display portion 10 to display the content list display screen 102 for accepting the instruction (playback instruction for the content, for example) related to the media player in the expanded display mode, whereby the user can issue an instruction (playback instruction for the content, for example) related to the media player displayed on the television set 5 through the built-in display portion 10 of the portable information processing device 1 at hand while observing the content of the media player displayed on the television set 5 in the expanded display mode. Thus, the user can issue an instruction related to the media player displayed on the television set 5 at hand while observing the content of the media player on the television set 5 whose size is large, whereby the content can be rendered easily recognizable and the instruction related to the media player can be rendered easily performable. Consequently, the convenience can be further improved According to the first embodiment, as hereinabove described, the CPU 18a is formed to select the expanded display mode for causing the television set 5 to display the media data (content) of the media player and causing the built-in display portion 10 to display the content list display screen 102 on the basis of that the television set 5 is connected to the HDMI connection portion 15, the media player is being started and the playback operation regarding the television set 5 as the output destination is performed so that the user can easily select a desired content from the content list on the built-in display portion 10 at hand and cause the television set 5 to display the content selected on the built-in display portion 10 at hand, whereby the convenience for the user in usage of the media player can be improved.

According to the first embodiment, as hereinabove described, the CPU 18a is formed to select the expanded display mode on the basis of that the playback operation for the media data (content) of the media player regarding the television set 5 as the output destination has been performed in the state where the television set 5 is connected to the HDMI connection portion 15 and in the state where the media player is being started, or that connection of the television set 5 to the HDMI connection portion 15 has been performed in the state where the media player is being started and in the state where the playback operation for the content is being performed so that the expanded display mode is automatically selected when the user simply selects a content regarding the television set 5 as an output destination at the time of usage of the media player or connects the television set 5 during a playback operation, whereby the convenience for the user in usage of the media player can be improved.

According to the first embodiment, as hereinabove described, the CPU 18a is formed to select the expanded display mode in response to that media data (content) played back when performing the playback operation for the media data regarding the television set 5 as the output destination has been selected from the content list display screen 102 by the user in the state where the television set 5 is connected to the HDMI connection portion 15 and in the state where the media player is being started, whereby the user may not separately perform a mode selecting operation in order to select the mirror display mode and the expanded display mode.

According to the first embodiment, as hereinabove described, the SD card connection portion to which the SD card 50 or the like in which media data (contents) are stored is connectable and the flash memory 18b capable of storing contents are provided and the CPU 18a is formed to select the expanded display mode on the basis of that the television set 5 is connected to the HDMI connection portion 15, the media player is being started and the playback operation for the content of the SD card 50 or the flash memory 18b is performed while regarding the television set 5 as the output destination, whereby the CPU 18a can perform a display according to the expanded display mode causing the television set 5 to display the content stored in the SD card 50 or the flask memory 18*b* and causing the built-in display portion 10 to display the content list display screen 102.

According to the first embodiment, as hereinabove described, the wireless LAN connection portion 12 capable of making communication based on the DLNA standard with the media-possessing apparatus 2 functioning as the digital media server through the home network is provided and the CPU 18*a* is formed to select the expanded display mode on the basis of that the television set 5 is connected to the HDMI connection portion 15, the media player is being started and the playback operation for the media data (content) of the digital media server has been performed while regarding the television set 5 as the output destination, whereby the CPU 18*a* can perform the display according to the expansion display mode causing the television set 5 directly connected without through the network to display the content stored in the digital media server in the DLNA network and causing the built-in display portion 10 to display the content list display screen 102.

According to the first embodiment, as hereinabove described, the CPU 18*a* is formed to cause the television set 5 directly connected to the HDMI connection portion 15 without through the network to display the content acquired from the digital media server through the wireless LAN connection portion 12 via the network as a pseudo digital media renderer and to cause the built-in display portion 10 to display the content list display screen 102 so that selection of media data is possible as a pseudo digital media controller in the expanded display mode, whereby the CPU 18*a* can easily cause the television set 5 directly connected to the built-in display portion 10 without through the network to display the content acquired from the DLNA digital media server in the network and cause the built-in display portion 10 to display the content list display screen 102.

According to the first embodiment, as hereinabove described, the CPU 18*a* is formed to switch the portable information processing device 1 from the expanded display mode to the mirror display mode on the basis of that the playback operation for the media data (content) has terminated, whereby the CPU 18*a* can easily switch the portable information processing device 1 to a display according to the mirror display mode after termination of the playback operation.

According to the first embodiment, as hereinabove described, the CPU 18*a* is formed to cause the built-in display portion 10 to display media data being played back in a case where the media player is being started and a playback operation for media data (content) regarding the television set 5 as an output destination is performed when the television set 5 is disconnected from the HDMI connection portion 15. When forming the CPU 18*a* in this manner, media data being played back is displayed on the built-in display portion 10 in a case where the television set 5 is so disconnected from the HDMI connection portion 15 that the media data (content) being played back cannot be displayed on the television set 5, whereby the user can continuously observe the media data being played back.

Second Embodiment

A second embodiment is now described with reference to FIGS. 18 to 22. In this second embodiment, a structure selecting an expanded display mode and causing a built-in display portion 10 to display a touch panel keyboard in a case where an application accompanied by character entry is being started is described, dissimilarly to the aforementioned first embodiment selecting the expanded display mode in the case where the media player is being started.

According to the second embodiment of the present invention, a CPU 18*a* of a portable information processing device 1 is formed to be capable of switching a mirror display mode causing an HDMI-connected non-DLNA television set 5 to display the same data as data displayed on the built-in display portion 10 and the expanded display mode causing the television set 5 to display data while causing the built-in display portion 10 to display data different from the data displayed on the television set 5. More specifically, the CPU 18*a* is formed to select the expanded display mode from the mirror display mode and the expanded display mode on the basis of that the television set 5 is connected to an HDMI connection portion 15 and an application accompanied by character entry is being started, as described later. Applications accompanied by character entry include a partial character entry application and a total character entry application. The partial character entry application is an application accompanied by character entry not as the whole but as part of an operation, and an Internet browser or the like corresponds thereto, for example. The total character entry application is an application accompanied by character entry as the whole of an operation, and an application for an electronic mail or an application for creating a text corresponds thereto, for example.

Figure 18:
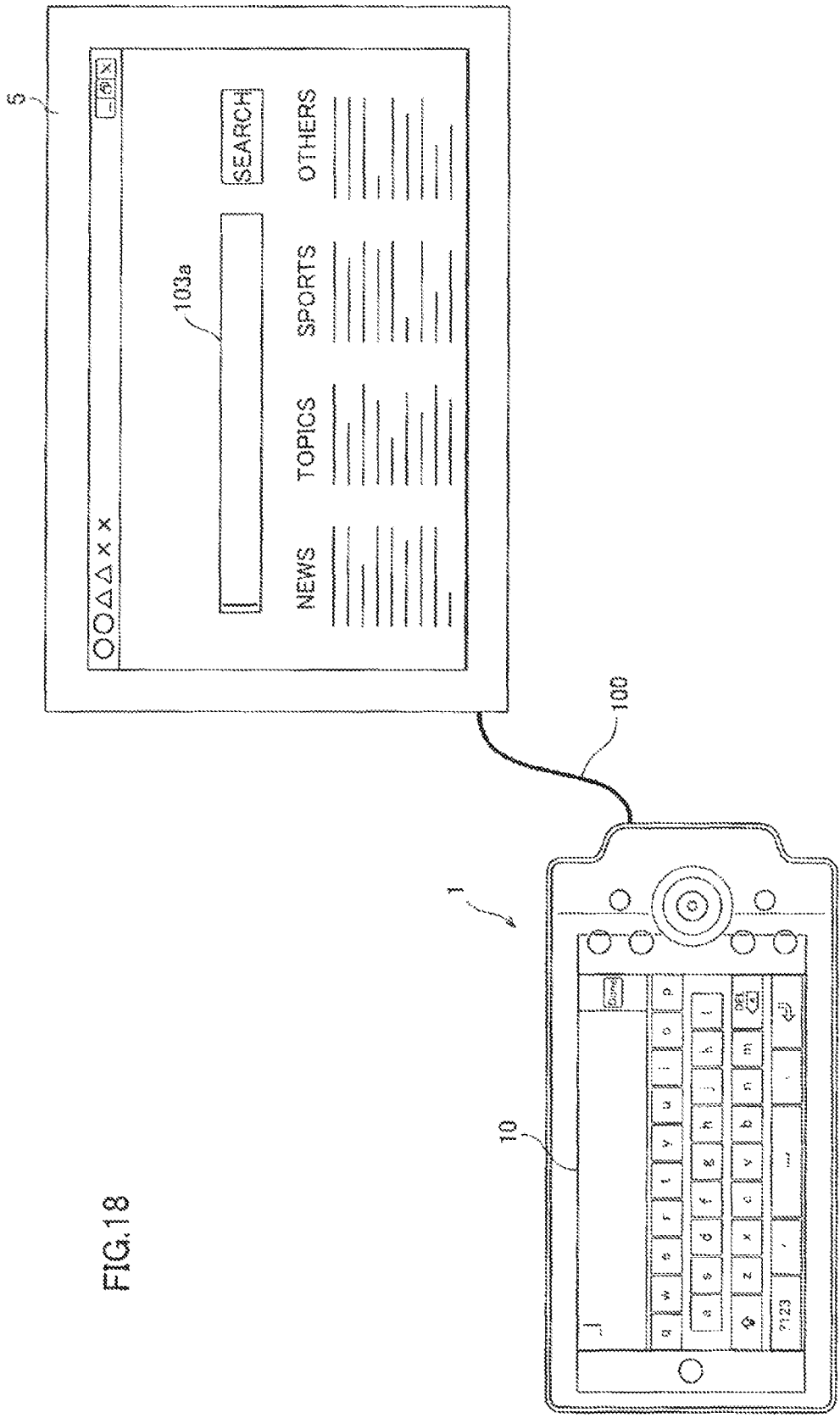
FIG. 18 A diagram showing a state causing respective ones of a built-in display portion of a portable information processing device according to a second embodiment of the present invention and a television set to expanded-display a touch panel keyboard and an Internet browser (application accompanied by character entry).

More detailedly, the CPU 18*a* of the portable information processing device 1 is formed to select the expanded display mode for causing the built-in display portion 10 to display a touch panel keyboard as an image for accepting entry while causing the HDMI-connected television set 5 to display an image of the partial character entry application as such when an operation at the time of character entry is performed by the user during starting of the partial character entry application in a state where the television set 5 noncorresponding to the DLNA is connected to the HDMI connection portion 15, as described later. The image of the partial character entry application is displayed on the television set 5 in such a mode that an entry result of the character entry is displayed, while the entry result of the character entry is displayed on the built-in display portion 10 along with the touch panel keyboard. The CPU 18*a* is formed, when the user positions a cursor on a search window 103*a* as an operation at the time of character entry while starting the Internet browser as the partial character entry application as shown in FIG. 18, for example, to cause the built-in display portion 10 to display the touch panel keyboard while causing the television set 5 to display the Internet browser.

Figure 19:
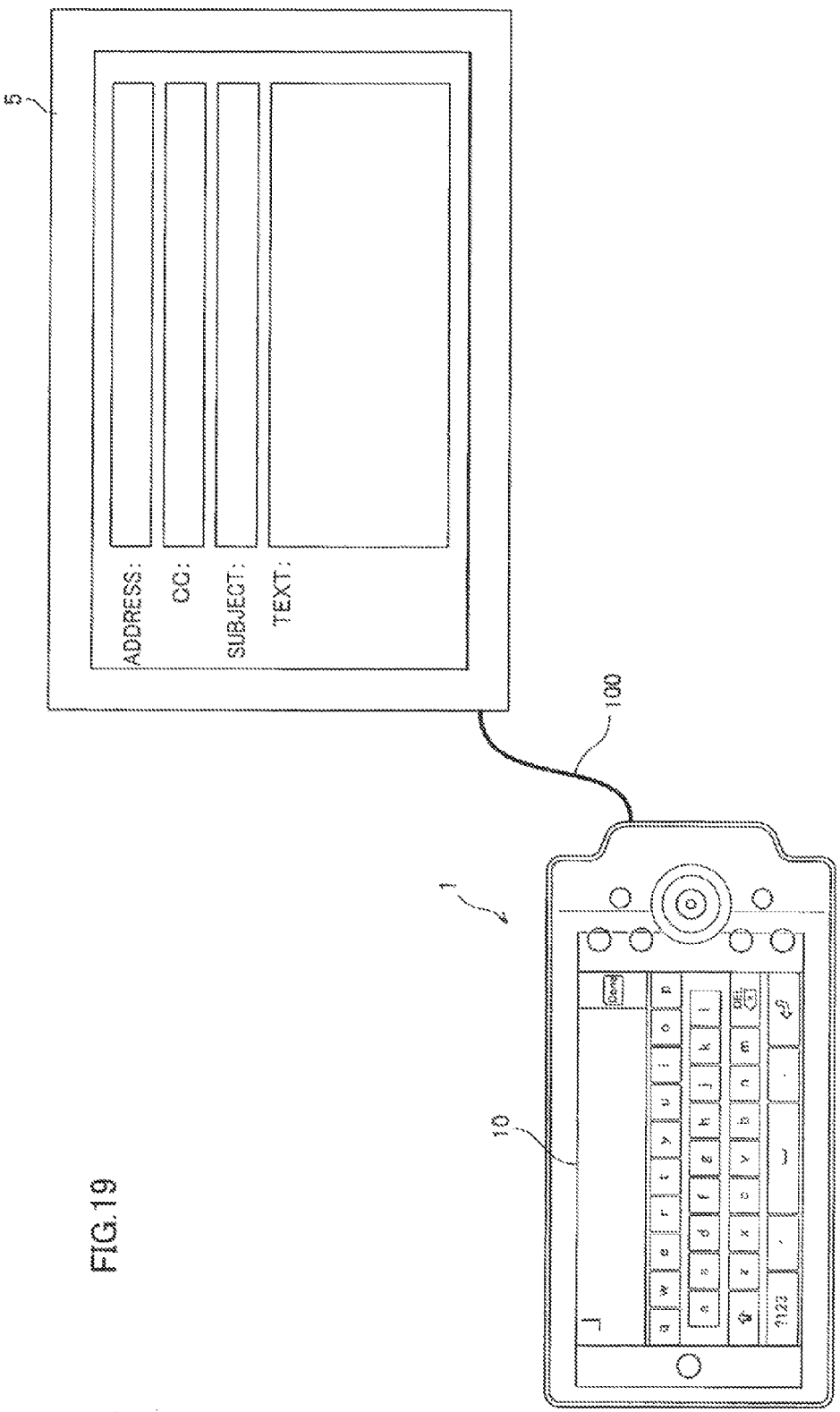
FIG. 19 A diagram showing a state causing the respective ones of the built-in display portion of the portable information processing device according to the second embodiment of the present invention and the television set to expanded-display the touch panel keyboard and an application (character entry application) for an electronic mail.

Further, the CPU 18*a* of the portable information processing device 1 is formed, when a total character entry application performing character entry as the whole of an operation is started in a state where the television set 5 noncorresponding to the DLNA is connected to the HDMI connection portion 15, to select the expanded display mode for causing the built-in display portion 10 to display the touch panel keyboard as the image for accepting entry and causing the HDMI-connected television set 5 to display an image of the character entry application. An image of the total character entry application is displayed on the television set 5 in such a mode that an entry result of the character entry is displayed, while the entry result of the character entry is displayed on the built-in display portion 10 along with the touch panel keyboard. The CPU 18*a* is formed, when the user starts an application for an electronic mail as the total character entry application as shown in FIG. 19, for example, to cause the television set 5 to display a screen of the application for the electronic mail and to cause the built-in display portion 10 to display the touch panel keyboard.

Processing at the time of character entry during starting of the partial character entry application in the portable information processing device 1 according to the second embodiment of the present invention is now described with reference to FIG. 20.

Figure 20:
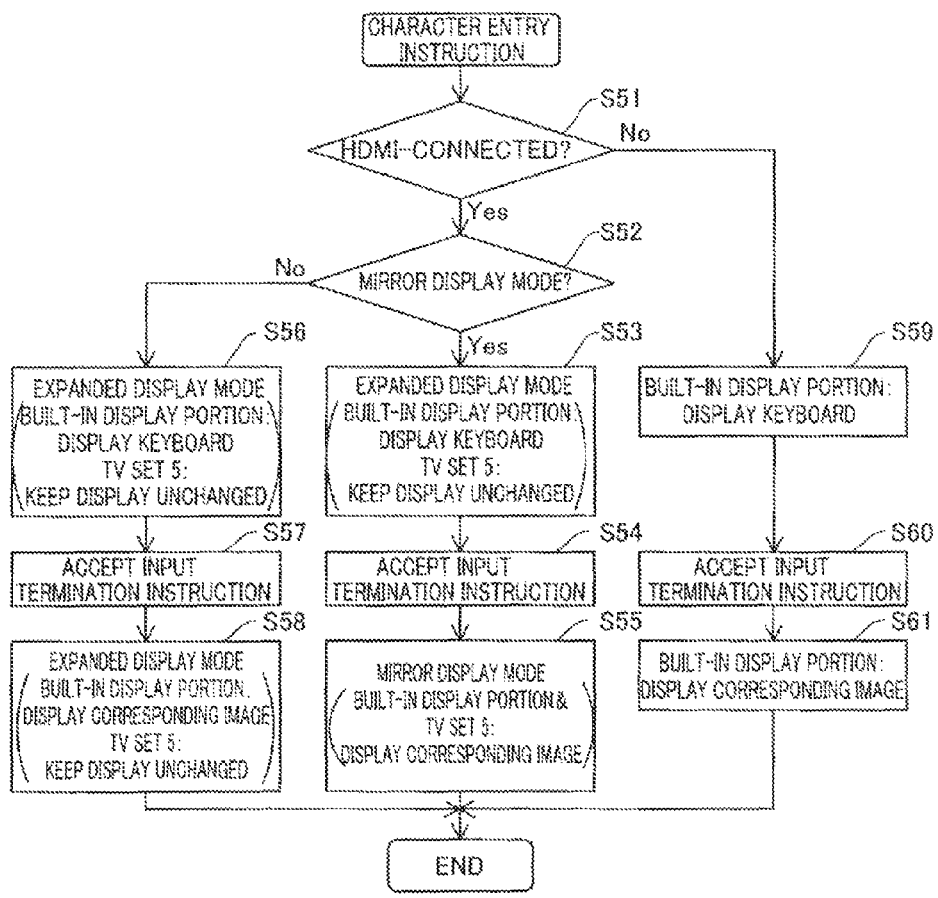
FIG. 20 A flow chart for illustrating processing at a time of character entry in the portable information processing device according to the second embodiment of the present invention.

In response to an operation (operation of positioning the cursor on the search window 103a, for example) at the time of character entry during starting of the partial character entry application (Internet browser, for example), the processing at the time of character entry shown in FIG. 20 is executed by the CPU 18a. First, the CPU 18a determines whether or not the television set 5 noncorresponding to the DLNA is connected to the HDMI connection portion 15 at a step S51. In a case where the television set 5 is connected, the CPU 18a determines whether or not the current states of the built-in display portion 10 and the HDMI-connected television set 5 are in the mirror display mode at a step S52. In the case of the mirror display mode, the CPU 18a switches the portable information processing device 1 to the expanded display mode for causing the built-in display portion 10 to display the touch panel keyboard while controlling the HDMI-connected television set 5 not to change the display (controlling the television set 5 to display the Internet browser as such, for example) at a step S53, as shown in FIG. 18.

Then, the CPU 18a accepts an entry termination instruction (instruction by pressing down an enter key or a search button, for example) by the user at a step S54, and thereafter switches the portable information processing device 1 to the mirror display mode which is the original state for causing both of the built-in display portion 10 and the HDMI-connected television set 5 to display a corresponding image (image after search of the Internet browser, for example) at a step S55.

In a case (case of the expanded display mode) where the current states of the built-in display portion 10 and the HDMI-connected television set 5 are not in the mirror display mode, the CPU 18a advances to a step S56. As the case (case of the expanded display mode) where the current states of the built-in display portion 10 and the HDMI-connected television set 5 are not in the mirror display mode, there is a case where a content list display screen 102 is displayed on the built-in display portion 10 while a content is played back/displayed on the HDMI-connected television set 5 in a state during starting of the media player as shown in FIG. 13, for example. In this case, there is a possibility that an operation of a character entry character by the user is performed such that the user performs a search operation for a content of a media player, for example.

Figure 21:
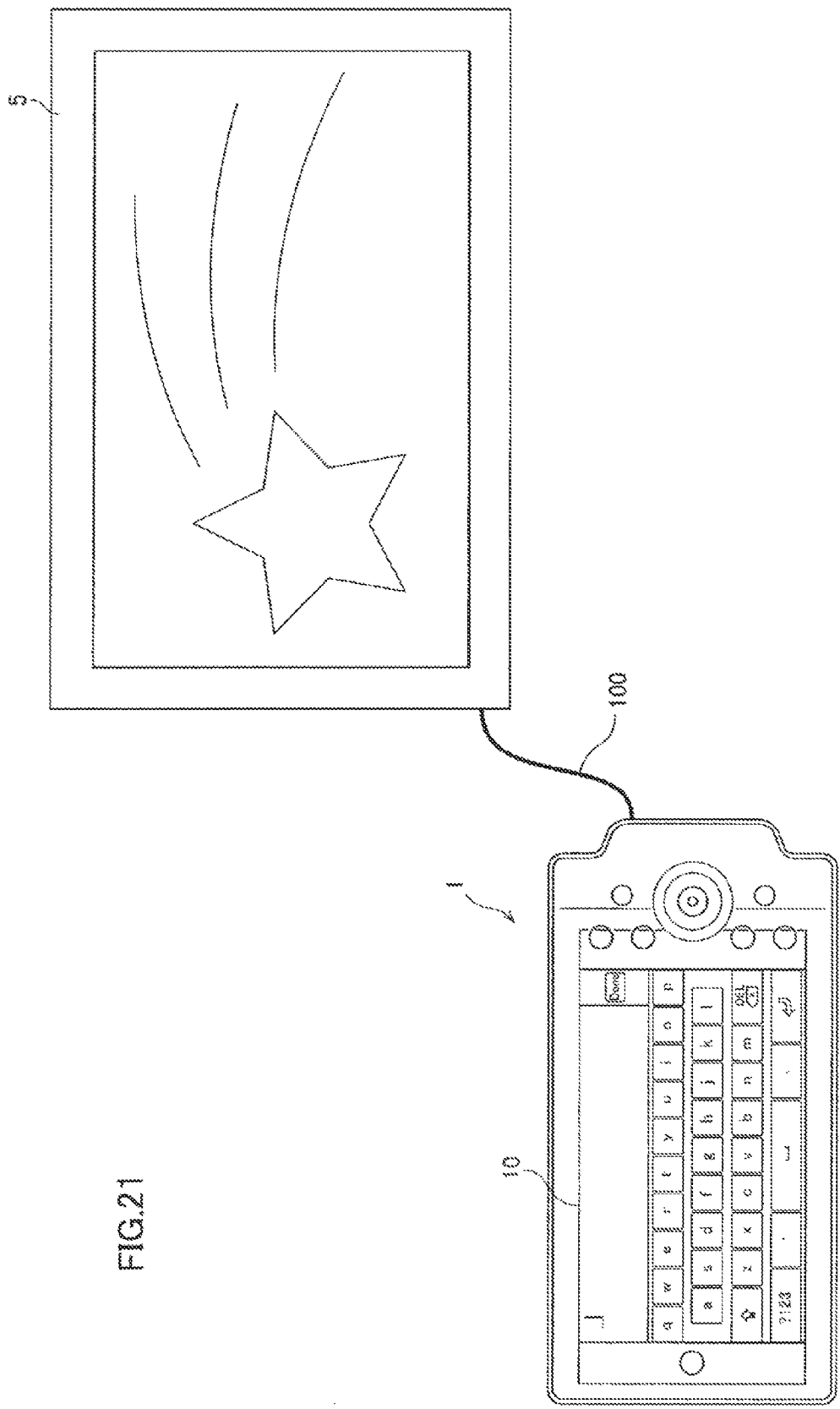
FIG. 21 A diagram showing a state casing the respective ones of the built-in display portion of the portable information processing device according to the second embodiment of the present invention and the television set to expanded-display the touch panel keyboard and the content of a media player.

In a case (case of the expanded display mode) where the current states are not in the mirror display mode, the CPU 18a causes the built-in display portion 10 to display the touch panel keyboard and controls the HDMI-connected television set 5 not to change the display (causes the television set 5 to play back/display the content of the media player as such, for example) as shown in FIG. 21 in a state continuing the expanded display mode at a step S56.

Then, the CPU 18a accepts an entry termination instruction (instruction by pressing down the enter key or the search button, for example) by the user at a step S57, and thereafter causes the built-in display portion 10 to display a corresponding image (search result, for example) and controls the HDMI-connected television set 5 not to change the display (causes the television set 5 to play back/display the content of the media player as such, for example) at a step S58 in the expanded display mode which is the original state.

When the television set 5 is not connected to the HDMI connection portion 15 in a case where an operation at the time of character entry is performed, the CPU 18a causes the built-in display portion 10 to display the touch panel keyboard at a step S59. Then, the CPU 18a accepts an entry termination instruction (instruction by pressing down the enter key, for example) by the user at a step S60, and thereafter causes the built-in display portion 10 to display the corresponding image (search result, for example) at a step S61. The processing at the time of character entry in the portable information processing device 1 according to the second embodiment of the present invention is performed in the aforementioned manner.

Processing at the time of starting of a total character entry application in the portable information processing device 1 according to the second embodiment of the present invention is now described with reference to FIG. 22.

Figure 22:
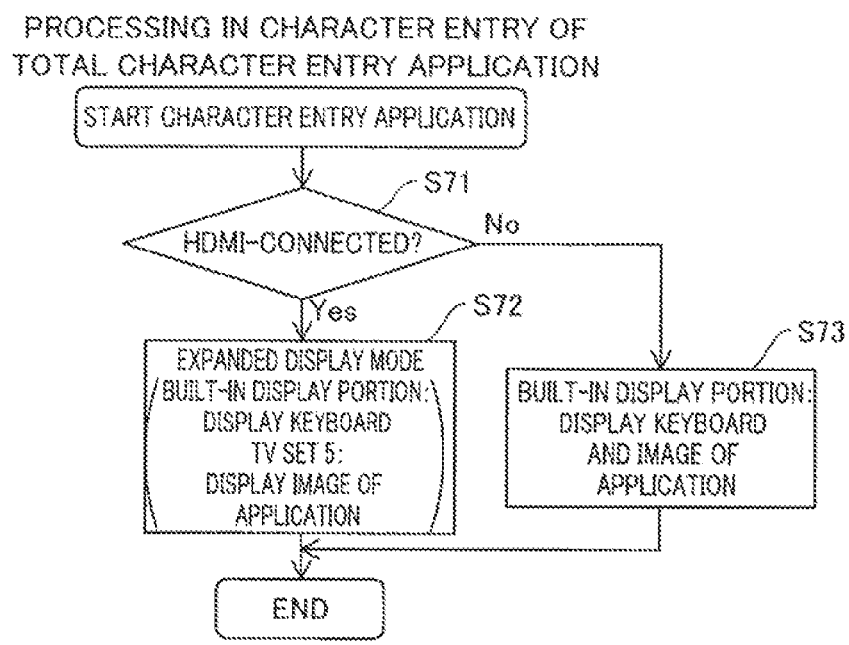
FIG. 22 A flow chart for illustrating processing at a time of starting a character entry application in the portable information processing device according to the second embodiment of the present invention.

In response to a starting operation for the total character entry application (the application for an electronic mail or the application for creating a text, for example), the processing at the time of starting of the total character entry application shown in FIG. 22 is executed by the CPU 18a. First, the CPU 18a determines whether or not the television set 5 noncorresponding to the DLNA is connected to the HDMI connection portion 15 at a step S71. In a case where the television set 5 is connected, the CPU 18a selects the expanded display mode at a step S72 for causing the built-in display portion 10 to display the touch panel keyboard and causing the HDMI-connected television set 5 to display an image (application image for an electronic mail, for example) of the application as shown in FIG. 19, and terminates the processing at the time of starting the total character entry application.

In a case where the television set 5 is not connected to the HDMI connection portion 15, on the other hand, the CPU 18a causes the built-in display portion 10 to display both of the touch panel keyboard and the image of the application at a step S73, and terminates the processing at the time of starting the total character entry application.

The remaining structure of the second embodiment is similar to that of the aforementioned first embodiment.

According to the second embodiment, as hereinabove described, the CPU 18a selecting the expanded display mode from the mirror display mode causing the built-in display portion 10 to display data while causing the television set 5 to display the same data as the data displayed on the built-in display portion 10 and the expanded display mode causing the television set 5 to display data while causing the built-in display portion 10 to display data different from the data displayed on the television set 5 on the basis of that the television set 5 is connected to the HDMI connection portion 15 and the application (the partial character entry application or the total character entry application) accompanied by character entry is being started so that the expanded display mode is selected in a case where it is preferable to bring the portable information processing device 1 into the expanded display mode in response to the situation, whereby the display modes (the mirror display mode and the expanded display mode) of the built-in display portion 10 and the television set 5 can be selectively distinguishably used. Further, the expanded display mode is automatically selected from the mirror display mode and the expanded display mode by the CPU 18a at least on the basis of that the television set 5 is connected to the HDMI connection portion 15 and the application (the partial character entry application or the total character entry application) accompanied by character entry is being started, whereby the user does not perform a mode selecting operation, but the expanded display mode is selected in a case where the application (the partial character entry application or the total character entry application) accompanied by character entry is being started while the mirror display mode is selected in a case of another application. Thus, an operational burden resulting from the user's mode selecting operation can be reduced, whereby convenience can be improved in relation to the display modes of the built-in display portion 10 and the television set 5.

According to the second embodiment, as hereinabove described, the CPU 18a is formed to select the expanded display mode at least on the basis of that the television set 5 is connected to the HDMI connection portion 15 and the application (the partial character entry application or the total character entry application) accompanied by character entry is being started so that the expanded display mode can be automatically selected with the CPU 18a in a case of performing character entry, whereby the user can display the touch panel keyboard for character entry on the built-in display portion 10 at hand while displaying the data of the application on the television set 5, and can easily perform the character entry as a result.

According to the second embodiment, as hereinabove described, the CPU 18a is formed to select the expanded display mode in response to a starting operation for the total character entry application (the application for an electronic mail or the application for creating a text, for example) or an operation at the time of character entry during starting of the partial character entry application (Internet browser, for example) so that the expanded display mode is automatically selected by the CPU 18a when the user simply starts the total character entry application or performs the operation at the time of character entry during starting of the partial character entry application, whereby the user may not separately perform a mode selecting operation for selecting the mirror display mode and the expanded display mode.

According to the second embodiment, as hereinabove described, the CPU 18a is formed to cause the television set 5 to display the data of the application (the partial character entry application or the total character entry application) accompanied by character entry and to cause the built-in display portion 10 to display the touch panel keyboard for character entry as an image for accepting entry in the expanded display mode so that the user can perform character entry by employing the touch panel keyboard displayed on the built-in display portion 10 at hand while observing the data of the application displayed on the television set 5, whereby he/she can easily perform the character entry, and the convenience can be more improved.

According to the second embodiment, the CPU 18a is formed to cause the television set 5 to display the image of the application accompanied by character entry in such a mode that the entry result of character entry is displayed and to cause the built-in display portion 10 to display the touch panel keyboard and the entry result of the character entry in the expanded display mode. When forming the CPU 18a in this manner, the entry result of the character entry is displayed on both of the television set 5 and the built-in display portion 10, whereby the user can confirm the entry result of the character entry on either one of the television set 5 and the built-in display portion 10.

According to the second embodiment, the CPU 18a is formed to return the portable information processing device 1 to one of the mirror display mode and the expanded display mode having been selected before performing character entry in a case where character entry with respect to the partial character entry application terminates in the expanded display mode. When forming the CPU 18a in this manner, the portable information processing device 1 is automatically returned to the mode before performing character entry in the case where the character entry terminates, whereby the user may not perform an operation of switching the portable information processing device 1 to the mode before performing the character entry in the case where the character entry terminates.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of HDMI-connecting the portable information processing device 1 and the non-DLNA television set 5 with each other has been shown in each of the aforementioned first and second embodiments, the present invention is not restricted to this. The present invention is applicable to any connection system so far as the portable information processing apparatus is directly connectable with the television set 5 without through the network and it is possible to perform a cooperative operation between apparatuses by connecting two apparatuses with each other by a cable capable of transmitting sound data, picture data and a control signal. The portable information processing device 1 and the non-DLNA television set 5 may be connected with each other in a wireless manner without through the network.

While the example of applying the present invention to the home network system constituted of the apparatuses corresponding to the DLNA has been shown in each of the aforementioned first and second embodiments, the present invention is not restricted to this. The present invention is also applicable to a network constituted by employing a standard, substantially equivalent to the DLNA, provided by a different vendor (apparatus maker) or a standard obtained by adding other functions to the functions of the DLNA, so far as the same is a network standard allowing sharing of media data between corresponding apparatuses connected to the network.

While the example of connecting the portable information processing device 1 with the DLNA apparatuses through the home network and connecting the same with the non-DLNA apparatus by HDMI connection has been shown in each of the aforementioned first and second embodiments, the present invention is not restricted to this. According to the present invention, the home network according to the DLNA is not requisite, but the present invention is also applicable to a case where the portable information processing device 1 is connected to only a non-DLNA apparatus by HDMI connection or a connection system similar to the HDMI connection and a DLNA home network is not connected thereto.

While the example of HDMI-connecting the television set 5 noncorresponding to the DLNA to the portable information processing device 1 has been shown in each of the aforementioned first and second embodiments, the present invention is not restricted to this. According to the present invention, the television set corresponding to the DLNA and the portable information processing device may be directly HDMI-connected with each other without through the network.

While the example of selecting the expanded display mode as the second mode on the basis of that the media player as the prescribed application in the present invention is being started has been shown in the aforementioned first embodiment, the present invention is not restricted to this. According to the present invention, the second mode may be selected on the basis of that an application other than the media player is being started.

While the example of selecting the expanded display mode as the second mode on the basis of that the Internet browser, the electronic mail or the media player as the application accompanied by character entry is being started has been shown in the aforementioned second embodiment, the present invention is not restricted to this. According to the present invention, the expanded display mode (second mode) may be selected on the basis of that an application other than the Internet browser, the electronic mail and the media player is being started.

While the example of selecting the expanded display mode as the second mode in both of the case where the playback operation for the content regarding the television set 5 as an external display device as the output destination is performed in the state where the media player is being started and the case where connection of the television set 5 is performed in the state where the media player is being started and the state where the playback operation for the content is being performed has been shown in the aforementioned first embodiment, the present invention is not restricted to this. According to the present invention, the second mode may be selected only in either one of the case where the playback operation for the content regarding the television set 5 as an external display device as the output destination is performed in the state where the media player is being started, or the case where connection of the television set 5 is performed in the state where the media player is being started and the state where the playback operation for the content is being performed.

While the example of selecting the expanded display mode as the second mode on the basis of that the playback operation for the content regarding the television set 5 as the output destination has been performed in the state where the television set 5 as the external display device is connected and the media player is being started and that connection of the television set 5 has been performed in the state where the television set 5 as the external display device is connected, the media player is being started and the playback operation for the content is being performed has been shown in the aforementioned first embodiment, the present invention is not restricted to this. According to the present invention, the second mode may be selected on the basis of only that the television set 5 is connected and the media player is being started.

While the example of selecting the expanded display mode as the second mode in response to both of the starting operation for the total character entry application and the operation at the time of character entry during starting of the partial character entry application has been shown in the aforementioned second embodiment, the present invention is not restricted to this. According to the present invention, the second mode may be selected in response to only either the starting operation for the total character entry application or the operation at the time of character entry during starting of the partial character entry application.

While the example of selecting the expanded display mode as the second mode on the basis of the starting operation for the total character entry application and the operation at the time of character entry during starting of the partial character entry application has been shown in the aforementioned second embodiment, the present invention is not restricted to this. According to the present invention, the second mode may be selected only on the basis of that the television set 5 is connected and the application (the partial character entry application or the total character entry application) accompanied by character entry is being started.

While the example of providing both of the SD card connection portion 14 as the recording medium connection portion and the flash memory 18b as the built-in memory has been shown in each of the aforementioned first and second embodiments, the present invention is not restricted to this. According to the present invention, only either the recording medium connection portion or the built-in memory may be provided.

While the example of forming the built-in display portion 10 of the portable information processing device 1 by an LCD has been shown in each of the aforementioned first and second embodiments, the present invention is not restricted to this. According to the present invention, the built-in display portion 10 may be formed by a PDP Plasma Display Panel), an organic EL (Electro-Luminescence) element, an FED (Field Emission Display) or the like.

While the example of employing the television set as an example of the "external display device" has been shown in each of the aforementioned first and second embodiments, the present invention is not restricted to this. According to the present invention, the external display device may simply be an apparatus such as a simple display device (monitor) or a projector having a playback/display function.

While the external storage units such as the USB memory and the hard disk and the SD card 50 have been employed as examples of the "portable recording medium" in each of the aforementioned first and second embodiments, the present invention is not restricted to this. According to the present invention, a memory stick or another memory card such as a PC card may be employed.

While the processing operations of the control portion have been described by employing the flow charts described in an event-driven manner in starting and described in a flow-driven manner as to processing operations after the starting for the convenience of illustration in each of the aforementioned first and second embodiments, the present invention is not restricted to this. According to the present invention, the processing operations of the control operation may be performed in a complete event-driven manner or in a complete flow-driven manner, or there may be performed in a parallel processing manner.

The invention claimed is:

1. A portable information processing device comprising:
   a built-in display portion capable of displaying data;
   a control portion, controlling a display on said built-in display portion, capable of acquiring data; and
   an external display device connection portion connectable with an external display device, wherein:
      said portable information processing device is formed to be switchable between a first mode causing said built-in display portion to display the data acquired by said control portion while causing said external display device to display the same data acquired by said control portion as the data displayed on said built-in display portion and a second mode causing said external display device to display the data acquired by said control portion while causing said built-in display portion to display data different from the data displayed on said external display device of the data acquired by said control portion,
      said control portion is formed to select said second mode at least on the basis of that said external display device is connected to said external display device connection portion after a prescribed application is started, and
      said control portion is formed to cause said built-in display portion to display an image for accepting an instruction or entry related to said prescribed application in said second mode.

2. The portable information processing device according to claim 1, wherein
said control portion is formed to select said second mode from said first mode and said second mode at least on the basis of that said external display device is connected to said external display device connection portion and a media player or an application accompanied by character entry is being started.

3. The portable information processing device according to claim 2, wherein
said control portion is formed to select said second mode for causing said external display device to display media data of the media player and to cause said built-in display portion to display a list of the media data so that selection of said media data is possible on the basis of that said external display device is connected to said external display device connection portion and an application of the media player is being started while an operation related to playback regarding said external display device as an output destination is performed.

4. The portable information processing device according to claim 3, wherein
said control portion is formed to select said second mode on the basis of that a playback operation for the media data of the media player regarding said external display device as the output destination has been performed in a state where said external display device is connected to said external display device connection portion and in a state where the application of said media player is being started, or that connection of said external display device to said external display device connection portion has been performed in the state where the application of the media player is being started and in a state where a playback operation for the media data is being performed.

5. The portable information processing device according to claim 4, wherein
said control portion is formed to select said second mode in response to that media data played back when performing the playback operation for the media data regarding said external display device as the output destination has been selected by the user from the list of said media data in the state where said external display device is connected to said external display device connection portion and in the state where the application of said media player is being started.

6. The portable information processing device according to claim 3, further comprising at least either a recording medium connection portion capable of connecting a portable recording medium in which media data is stored, or a built-in memory capable of storing the media data, wherein
said control portion is formed to select said second mode on the basis of that said external display device is connected to said external display device connection portion and the application of said media player is being started while an operation related to playback of media data of at least either said portable recording medium or said built-in memory is performed while regarding said external display device as an output destination.

7. The portable information processing device according to claim 3, further comprising a communication portion capable of making communication based on a prescribed network standard with a corresponding apparatus functioning as a digital media server by said prescribed network standard allowing sharing of media data between corresponding apparatuses connected to a network, wherein
said control portion is formed to select said second mode on the basis of that said external display device is connected to said external display device connection portion and the application of said media player is being started while an operation related to playback of media data of said digital media server has been performed while regarding said external display device as an output destination.

8. The portable information processing device according to claim 7, formed to cause said external display device directly connected to said external display device connection portion without through the network to display media data acquired from said digital media server via the network through said communication portion as a pseudo digital media renderer and to cause said built-in display portion to display the list of said media data so that selection of said media data is possible as a pseudo digital media controller.

9. The portable information processing device according to claim 3, wherein
said control portion is formed to switch the portable information processing device from said second mode to said first mode on the basis of that the replay operation for the media data has terminated.

10. The portable information processing device according to claim 3, wherein
said control portion is formed to cause said built-in display portion to display media data being played back in a case where the application of the media player is being started and the playback operation for the media data regarding said external display device as the output destination is performed when said external display device is disconnected from said external display device connection portion.

11. The portable information processing device according to claim 1, wherein
said control portion is formed to select said second mode at least on the basis of that said external display device is connected to said external display device connection portion and an application accompanied by character entry is being started.

12. The portable information processing device according to claim 11, wherein
said control portion is formed to select said second mode in response to at least either a starting operation for said application accompanied by character entry or an operation at the time of character entry during starting of said application accompanied by character entry.

13. The portable information processing device according to claim 11, wherein
said control portion is formed to cause said external display device to display data of said application accompanied by character entry and to cause said built-in display portion to display a touch panel keyboard for character entry as an image for accepting entry at the time of said second mode.

14. The portable information processing device according to claim 13, wherein
said control portion is formed to cause said external display device to display the data of said application accompanied by character entry in such a mode that an entry result of the character entry is displayed and to cause said built-in display portion to display the touch panel keyboard for character entry and the entry result of the character entry in said second mode.

15. The portable information processing device according to claim 11, wherein said application accompanied by character entry includes a plurality of types of applications, and said control portion is formed to return the portable information processing device to one if said first mode and said second mode having been selected before performing the character entry in a case where character entry with respect to a prescribed application included in the plurality of said applications accompanied by character entry terminates in said second mode.

16. The portable information processing device according to claim 1, wherein said external display device connection portion includes a connection portion corresponding to a prescribed interface standard capable of connecting two apparatuses with each other by a prescribed cable capable of transmitting sound data, picture data and a control signal and performing a cooperative operation between the apparatuses with respect to the external display device directly connected without through said network.

17. The portable information processing device according to claim 1, wherein said external display device connection portion is directly connectable with said external display device without going through said network.

18. The portable information processing device according to claim 1, wherein said external display device connection portion is connectable with said external display device by going through said network.

* * * * *